(12) United States Patent
Ma et al.

(10) Patent No.: US 10,841,141 B2
(45) Date of Patent: Nov. 17, 2020

(54) PILOT DESIGN FOR OFDM SYSTEMS WITH FOUR TRANSMIT ANTENNAS

(71) Applicant: APPLE INC., Cupertino, CA (US)

(72) Inventors: Jianglei Ma, Kanata (CA); Ming Jia, Ottawa (CA); Wen Tong, Ottawa (CA); Peiying Zhu, Kanata (CA); Claude Royer, Gatineau (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/511,348

(22) Filed: Jul. 15, 2019

(65) Prior Publication Data

US 2019/0372812 A1    Dec. 5, 2019

Related U.S. Application Data

(63) Continuation of application No. 15/674,785, filed on Aug. 11, 2017, now Pat. No. 10,374,856, which is a
(Continued)

(51) Int. Cl.
*H04L 27/26* (2006.01)
*H04L 5/00* (2006.01)
(Continued)

(52) U.S. Cl.
CPC ............ *H04L 27/261* (2013.01); *H04B 7/06* (2013.01); *H04B 7/0615* (2013.01);
(Continued)

(58) Field of Classification Search
CPC ... H04L 27/261; H04L 5/0026; H04L 5/0048; H04L 25/0204; H04L 25/0226;
(Continued)

(56) References Cited

U.S. PATENT DOCUMENTS 5,867,478 A * 2/1999 Baum .................. H04L 1/06
370/203
6,473,467 B1  10/2002 Wallace et al.
(Continued)

FOREIGN PATENT DOCUMENTS

CN    1331528    1/2002
CN    1414803    4/2003
(Continued)

OTHER PUBLICATIONS

Rob et al., "Enhanced Mac Support for MIMO OFDMA, C80216e-04_19", IEEE Draft: C80216E-044_99, IEEE-SA, Piscataway, NJ USA, vol. 802.16e Jun. 14, 2004 (Jun. 14, 2004), pp. 1-9, XP017623816.
(Continued)

*Primary Examiner* — Christopher P Grey
(74) *Attorney, Agent, or Firm* — Fay Kaplun & Marcin, LLP

(57) ABSTRACT

Pilot, preamble and midamble patterns are provided that are particularly suited for four transmit antenna OFDM systems. Pilots are inserted in a scattered manner for each of the four antennas, either uncoded, space-time coded in pairs, space-time frequency coded in pairs, or space-time-frequency coded.

20 Claims, 28 Drawing Sheets

Related U.S. Application Data continuation of application No. 14/672,529, filed on Mar. 30, 2015, now Pat. No. 9,742,606, which is a continuation of application No. 13/855,296, filed on Apr. 2, 2013, now Pat. No. 8,995,402, which is a continuation of application No. 10/593,053, filed as application No. PCT/CA2005/000387 on Mar. 15, 2005, now Pat. No. 8,462,611.

(60) Provisional application No. 60/553,161, filed on Mar. 15, 2004, provisional application No. 60/558,566, filed on Apr. 2, 2004, provisional application No. 60/566,009, filed on Apr. 28, 2004.

(51) Int. Cl.
*H04B 7/06* (2006.01)
*H04L 25/02* (2006.01)

(52) U.S. Cl.
CPC ......... *H04B 7/0684* (2013.01); *H04L 5/0026* (2013.01); *H04L 5/0048* (2013.01); *H04L 25/0204* (2013.01); *H04L 25/0226* (2013.01); *H04L 25/0234* (2013.01)

(58) Field of Classification Search
CPC ..... H04L 25/0234; H04B 7/0615; H04B 7/06; H04B 7/0684
See application file for complete search history.

(56) References Cited

U.S. PATENT DOCUMENTS

| | | | |
|---|---|---|---|
| 6,747,959 B1 | 6/2004 | Ho | |
| 7,248,559 B2* | 7/2007 | Ma | H04B 7/04 370/208 |
| 7,436,757 B1* | 10/2008 | Wilson | H04L 5/0058 370/203 |
| 10,374,856 B2* | 8/2019 | Ma | H04L 25/0204 |
| 10,411,783 B2* | 9/2019 | Taherzadehboroujeni | H04B 7/0891 |
| 2002/0044591 A1* | 4/2002 | Lee | H04B 7/0669 375/130 |
| 2002/0122381 A1 | 9/2002 | Wu et al. | |
| 2003/0072254 A1* | 4/2003 | Ma | H04B 7/04 370/208 |
| 2003/0072255 A1* | 4/2003 | Ma | H04B 7/022 370/208 |
| 2003/0161282 A1* | 8/2003 | Medvedev | H04B 7/0417 370/329 |
| 2003/0235147 A1* | 12/2003 | Walton | H04B 7/04 370/204 |
| 2004/0114618 A1* | 6/2004 | Tong | H04B 7/026 370/431 |
| 2006/0120273 A1* | 6/2006 | Wang | H04B 7/0669 370/208 |
| 2007/0053282 A1* | 3/2007 | Tong | H04L 5/0023 370/208 |
| 2008/0247479 A1* | 10/2008 | Ma | H04B 7/0452 375/260 |
| 2009/0067522 A1* | 3/2009 | Kwak | H04L 5/0048 375/260 |
| 2009/0303918 A1* | 12/2009 | Ma | H04B 7/2606 370/315 |
| 2020/0067749 A1* | 2/2020 | Ma | H04L 25/02 |

FOREIGN PATENT DOCUMENTS

| | | |
|---|---|---|
| EP | 1185048 | 3/2002 |
| WO | 0072464 | 11/2000 |
| WO | 2003-034642 | 4/2003 |
| WO | 2003-034644 | 4/2003 |
| WO | 2004-077730 | 9/2004 |

OTHER PUBLICATIONS

"Extension of Collaborative Spatial Multiplexing in OFDMA, C80216e-04_286r2", IEEE Draft: C80216E-04_286R2, IEEE-SA, Piscataway, NJ USA, vol. 802.16e Aug. 29, 2004 (Aug. 29, 2004), pp. 1-6, XP017624418.

* cited by examiner

PILOT DESIGN FOR OFDM SYSTEMS WITH FOUR TRANSMIT ANTENNAS

FIELD OF THE INVENTION

The invention relates to pilot designs for OFDM (orthogonal frequency division multiplexing) systems with four transmit antennas.

BACKGROUND OF THE INVENTION

New applications of mobile communications demand high-speed and high-quality, bandwidth-efficient wireless access solutions. The application of MIMO (multiple antennas both in the transmitter and in the receiver) has been demonstrated to drastically improve channel capacity compared to single-antenna systems. On the other hand, OFDM has demonstrated its high spectral efficiency and ability to deal with frequency selective fading and narrow band interference. Therefore the combination of OFDM with spectrally efficient multiple antenna techniques opens the door to high data-rate wireless communication.

Compared with the single input single output (SISO) systems, two kinds of gains are provided by the MIMO wireless systems, namely diversity gain and multiplexing gain. With diversity gain more reliable reception can be realized. With multiplexing gain the capacity of MIMO systems increases linearly with the number of transmit and receive antennas. This is due to the fact that a rich scattering environment can provide multiple data pipes within the same frequency band by using techniques such as space-time coding and space-time layering. Since the capacity can be potentially increased by the application of multiple antennas, the use of up to four antennas at the transmitter and/or receiver has been considered to achieve an increased data rate for a given link performance criterion, or to improve link performance for a given data rate.

For wireless propagation environments, the inherent temporal and spatial variations of wireless channels impose more challenges on the design of a reliable communication system. For noise and interference limited systems, coherent demodulation can achieve 2.5-3 dB SNR gain compared to the differential demodulation. When coherent detection is performed in a receiver, reliable channel estimation is very important to the system performance. Channel estimation in MIMO systems is more complicated because multiple channels should be obtained individually. As the number of transmit antennas increases, the sensitivity to any channel estimation error becomes more pronounced.

OFDM modulation has been adopted by several standards, such as DVT-T, IEEE802.11a/g and IEEE802.16a/d. Different training schemes have been employed in these standards, including preamble, fixed-location pilot and variable-location pilot. However MIMO is not mandatory and is only adopted by IEEE802.16a as optional, and only two transmit antennas on the base station side and one receive antennas on the SS (subscriber station) side are employed. Since IEEE802.16a is designed for fixed and portable applications, the channel varies slowly. For the Wireless MAN (metropolitan area network) OFDM air-interface, the channel estimation is obtained from the preambles. For the Wireless MAN OFDMA air-interface, although variable location pilot symbols are introduced, they are only used to update the channel slowly.

SUMMARY OF THE INVENTION

According to one broad aspect, the invention provides a method of transmitting over four transmit antennas comprising: for each antenna, generating a respective sequence of OFDM symbols, each OFDM symbol having a plurality of sub-carriers carrying at data or pilots, and transmitting the sequence of OFDM symbols; wherein pilots are inserted for the four antennas collectively in blocks of two sub-carriers by two OFDM symbols scattered in time and frequency.

In some embodiments, pilots are inserted for the four antennas collectively in blocks of two sub-carriers by two OFDM symbols scattered in time and frequency by: inserting such blocks of two sub-carriers by two OFDM symbols scattered in a first regularly spaced pattern in even pairs of OFDM symbols; inserting such blocks of two sub-carriers by two OFDM symbols scattered in a second regularly spaced pattern offset from said first regularly spaced pattern in odd pairs of OFDM symbols.

In some embodiments, the first regularly spaced pattern comprises a repeating pattern of two pilot sub-carriers, ten data sub-carriers and the second regularly spaced pattern comprises six data sub-carriers followed by a repeating pattern of two pilot sub-carriers and ten data sub-carriers.

In some embodiments, each block of two sub-carriers by two OFDM symbols comprises a single pilot for each of the four antennas in a respective position within the block.

In some embodiments, the single pilot for each of the four antennas takes the same position in every block of two sub-carriers by two OFDM symbols.

In some embodiments, each block of two sub-carriers by two OFDM symbols is divided into pilot pairs, each pilot pair being transmitted by a respective pair of antennas.

In some embodiments, each pilot pairs is arranged sequentially in time.

In some embodiments, each pilot pair is arranged sequentially in frequency.

In some embodiments, pilots are inserted for the four antennas collectively in blocks of two sub-carriers by two OFDM symbols scattered in time and frequency in a repeating pattern of six OFDM symbols comprising each comprising a first, second and third pair of OFDM symbols, the method comprising: inserting such blocks of two sub-carriers by two OFDM symbols scattered in a first regularly spaced pattern in each first pair of OFDM symbols; inserting such blocks of two sub-carriers by two OFDM symbols scattered in a second regularly spaced pattern offset from said first regularly spaced pattern in each second pair of OFDM symbols; and inserting such blocks of two sub-carriers by two OFDM symbols scattered in a third regularly spaced pattern offset from said second regularly spaced pattern in each third pair of OFDM symbols.

In some embodiments, pilots are inserted for the four antennas collectively in blocks of two sub-carriers by two OFDM symbols scattered in time and frequency in a repeating pattern of OFDM symbols that is a multiple of two OFDM symbols in length.

According to another broad aspect, the invention provides a method of transmitting over four transmit antennas comprising: for antenna, generating a respective sequence of OFDM symbols, each OFDM symbol having a plurality of sub-carriers carrying at data or pilots, and transmitting the sequence of OFDM symbols; wherein for a first pair of the four antennas, pairs of pilots are inserted scattered in time and frequency; wherein for a second pair of the four antennas, pairs of pilots are inserted scattered in time and frequency in locations different from pilots for the first pair of antennas.

In some embodiments, for each pair of two pilots, the two pilots are not consecutive in time or frequency.

In some embodiments, for each pair of two pilots, the two pilots are arranged consecutively in time.

In some embodiments, pilots are inserted in a repeating pattern of six OFDM symbols comprising each comprising a first, second and third pair of OFDM symbols, wherein each pair of pilots is arranged sequentially in time: inserting pilot pairs for the first pair of antennas scattered in a first regularly spaced pattern in each first pair of OFDM symbols; inserting pilot pairs for the first pair of antennas scattered in a second regularly spaced pattern offset from said first regularly spaced pattern in each second pair of OFDM symbols; inserting pilot pairs for the first pair of antennas scattered in a third regularly spaced pattern offset from said second regularly spaced pattern in each third pair of OFDM symbols; inserting pilot pairs for the second pair of antennas scattered in a fourth regularly spaced pattern in each first pair of OFDM symbols offset from said first pattern; inserting pilot pairs for the second pair of antennas scattered in a fifth regularly spaced pattern offset from said fourth regularly spaced pattern and said second regularly spaced pattern in each second pair of OFDM symbols; inserting pilot pairs for the second pair of antennas scattered in a sixth regularly spaced pattern offset from said fifth regularly spaced pattern and said third regularly spaced pattern in each third pair of OFDM symbols.

According to another broad aspect, the invention provides a method of transmitting over four transmit antennas comprising: for each antenna, generating a respective sequence of OFDM symbols, each OFDM symbol having a plurality of sub-carriers carrying at data or pilots, and transmitting the sequence of OFDM symbols; wherein pilots are arranged in groups of four consecutive pilots in time, each group of four consecutive pilots containing pilots for the four antennas.

In some embodiments, such groups of four consecutive pilots are inserted in each set of four consecutive OFDM symbols, and in each of a plurality of spaced sub-carriers.

In some embodiments, each group of four consecutive pilots comprises a pair of space time coded pilots for a first pair of antennas of the four antennas, and a pair of space time coded pilots for a second pair of antennas of the four antennas.

In some embodiments, each group of four consecutive pilots comprises a single pilot for each of the four antennas.

In some embodiments, the location of the single pilot for each antenna varies across groups of four consecutive pilots.

In some embodiments, the method further comprises: using different pilot patterns for respective four antenna transmitters to reduce interference between pilots of different four antenna transmitters.

In some embodiments, the method further comprises: transmitting pilots with a power higher than average power.

In some embodiments, data and pilots are transmitted using QPSK, with the pilots being transmitted with a relative power boost.

In some embodiments, data is transmitted using a QAM constellation, and pilots are transmitted using QPSK with signal constellation points at corners of the QAM constellation.

In some embodiments, the method further comprises transmitting at least one fixed pilot for each of at least one of the four antennas.

In some embodiments, the method further comprises transmitting at least one fixed pilot for each of two pairs of antennas within said four antennas.

In some embodiments, the method further comprises transmitting at least one fixed signalling channel for each of two pairs of antennas within said four antennas.

In some embodiments, the method further comprises: transmitting relatively reliable signalling channel information proximal in time and frequency to locations of pilots.

In some embodiments, transmitting relatively reliable signalling channel information proximal in time and frequency to locations of pilots comprises: for pairs of antennas of the four antennas, transmitting space time coded signalling channel information pairs adjacent in time to pairs of pilots.

In some embodiments, for a given antenna, a spacing between pilots in the time direction is determined with consideration to the maximum Doppler frequency, while a spacing between pilot in the frequency direction is determined with consideration to a delay spread of multi-path fading.

According to another broad aspect, the invention provides a method of transmitting over four transmit antennas comprising: for each antenna, generating a respective sequence of OFDM symbols, each OFDM symbol having a plurality of sub-carriers carrying at data or pilots, and transmitting the sequence of OFDM symbols; wherein the OFDM symbols include at least one preamble OFDM symbol or midamble OFDM symbol comprising a repeating pattern of four pilot sub-carriers for the four antennas.

In some embodiments, the repeating pattern of four pilot sub-carriers comprises a first space-frequency coded pilot pair for a first pair of the four antennas, and a second space-frequency coded pilot pair for a second pair of the four antennas.

In some embodiments, the repeating pattern of four pilot sub-carriers comprises a respective pilot for each of the four antennas without overlapping.

In some embodiments, the preamble comprises two identical OFDM symbols.

In some embodiments, the method further comprises transmitting the pair of identical OFDM symbols by: transmitting a prefix; transmitting a first OFDM symbol having first and second portions in time, the second portion being identical to the prefix, such that the prefix functions as a cyclic prefix for the first OFDM symbol; transmitting a second OFDM symbol identical to the first OFDM symbol, such that the second portion of the first OFDM symbol functions as a prefix for the second OFDM symbol.

In some embodiments, the prefix and pair of identical symbols are transmitted with a total time duration equal to a time for transmitting a prefix and a single OFDM symbol that is not part of the preamble or midamble.

In some embodiments, antennas can be turned off and pilot groups assigned to the turned off antennas re-assigned to the remaining two transmit antennas to improve the channel estimation performance for fast frequency selective fading channel.

In some embodiments, the four transmit antennas form part of a single base station transceiver.

In some embodiments, the four transmit antennas form part of multiple base station transceivers.

In some embodiments, the four transmit antennas form part of multiple mobile stations.

In some embodiments, the pilots are space-time coded.

In some embodiments, the pilots are space-frequency coded.

In some embodiments, the pilots are space-time-frequency coded.

In some embodiments, the pilots are uncoded.

According to another broad aspect, the invention provides a method of transmitting over at least two transmit antennas comprising: for each antenna, generating a respective sequence of OFDM symbols, each OFDM symbol having a plurality of sub-carriers carrying at data or pilots, and transmitting the sequence of OFDM symbols; wherein pilots are inserted for the antennas collectively in blocks of two sub-carriers by two OFDM symbols scattered in time and frequency.

According to another broad aspect, the invention provides a method of transmitting a pair of identical OFDM symbols comprising: transmitting a prefix; transmitting a first OFDM symbol having first and second portions in time, the second portion being identical to the prefix, such that the prefix functions as a cyclic prefix for the first OFDM symbol; transmitting a second OFDM symbol identical to the first OFDM symbol, such that the second portion of the first OFDM symbol functions as a prefix for the second OFDM symbol.

In another embodiment, a transmitter comprising four transmit antennas is provided, the transmitter is adapted to implement one of the methods summarized above.

In another embodiment, at least two base station transceivers collectively comprising four transmit antennas are provided, the at least base station transceivers are adapted to implement one of the methods as summarized above.

In another embodiment, at least two mobile stations collectively comprising four transmit antennas are provided, the at least two mobile stations are adapted to implement one of the methods as summarized above.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Problems and disadvantages of the existing solutions which included in 802.11a/g and 802.16a are that they doe not support MIMO transmission with four transmit antennas, do not support high speed mobility and are not optimal for TDD employment.

Figure 1:
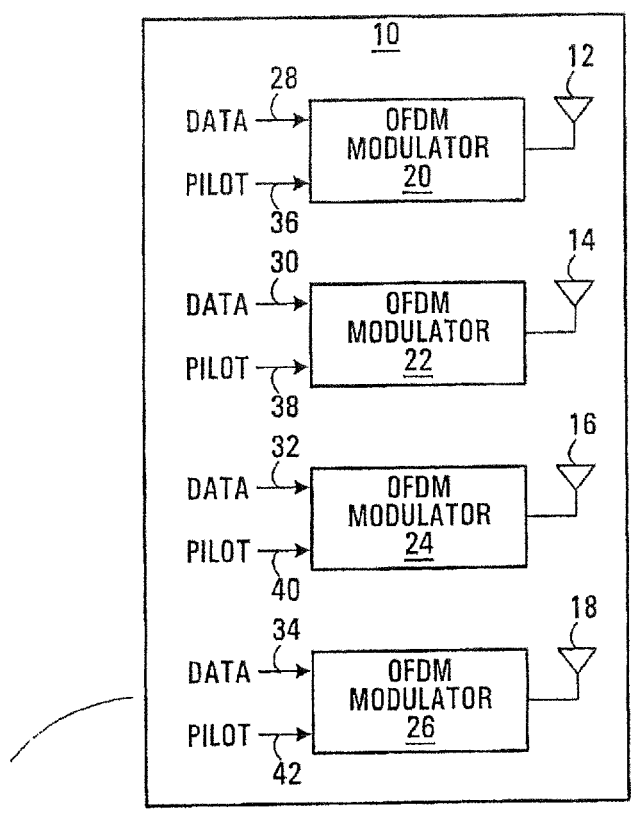
FIG. 1 is a block diagram of a four antenna OFDM transmitter in which data and pilot are modulated onto each OFDM signal.

A system block diagram is shown in FIG. 1. A MIMO transmitter 10 is shown having four transmit antennas 12,14, 16,18. For each transmit antenna, there is a respective OFDM modulator 20,22,24,26. The OFDM modulators 20,22,24,26 have respective data inputs 28,30,32,34 and pilot inputs 36,38,40,42. It is noted that while one OFDM modulator is shown per antenna, some efficiencies may be realized in combining these functions. Alternatively, since the pilot channel inputs are predetermined, this can be determined within the OFDM modulators per se. Furthermore, while separate data inputs 28,30,32,34 are shown, these may be used to transmit data from one or more sources. Encoding may or may not be performed. Details of the OFDM modulators are not shown. It is well understood that with OFMD modulation, the data and the pilot channel symbols are mapped to sub-carriers of an OFDM signal. In order to generate a particular pilot design, this involves controlling the timing of when data symbols versus pilot symbols are applied to particular sub-carriers and for particular OFDM symbol durations.

Figure 2:
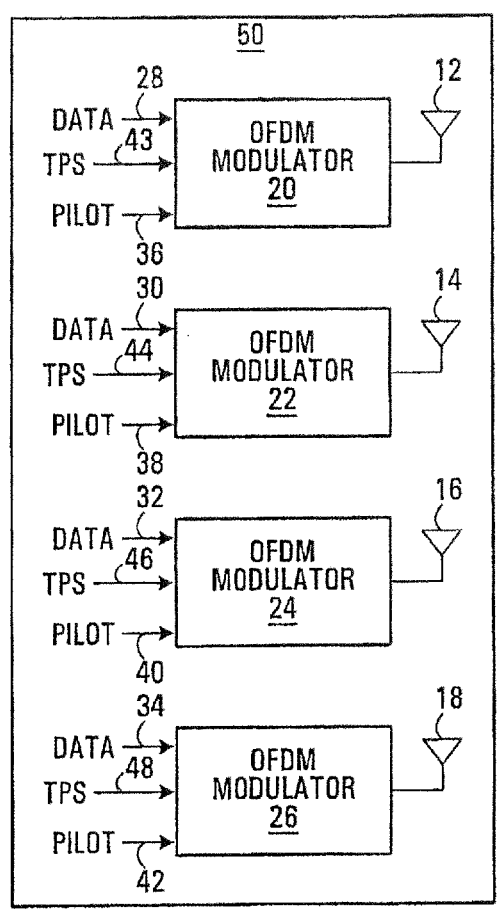
FIG. 2 is a block diagram of a four antenna OFDM transmitter in which data, TPS and pilot are modulated onto each OFDM signal.

In another system block diagram, shown in FIG. 2, the OFDM modulators 20,22,24,26 also receive respective TPS (transmit parameter signalling) data 43,44,46,48 which is also used in generating the OFDM signals. Once again, the TPS symbols are mapped by the OFDM modulator to appropriate sub-carrier locations and OFDM symbol durations.

Figure 3:
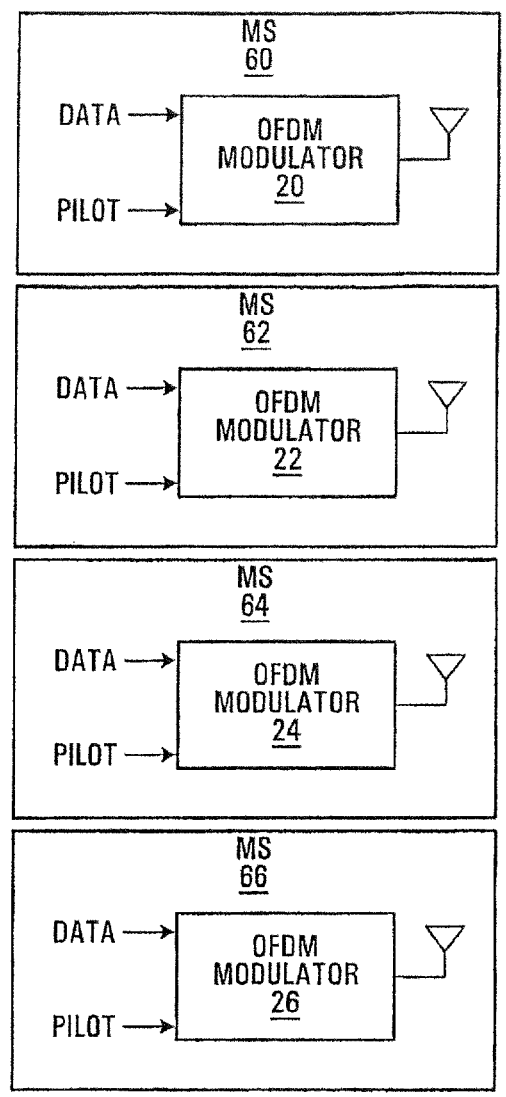
FIG. 3 is a block diagram of a four antenna OFDM system in which the four antennas are located on respective mobile stations each transmitting data and pilot.

In yet another embodiment, shown in FIG. 3, four mobile stations 60,62,64,66 are shown. Each of these has their own OFDM modulator and transmit antenna. These embodiments can function similar to the embodiments of FIGS. 1 and 2 but with the respective signals being generated in different mobile stations rather than in a single MIMO transmitter. Collectively, the four mobile stations 60,62,64, 66 function as a MIMO transmitter.

Coherent detection is required to achieve high spectrum efficiency. Pilot assisted channel estimation is a widely applied approach to measure the change of the amplitude and phase of the transmitted signals caused by the corruption of the radio channel.

For pilot-assisted channel estimation, known pilot symbols are multiplexed into the data stream at certain sub-channels (sub-carriers) and certain times. The receiver interpolates the channel information derived from the pilot symbols and obtains the channel estimates for the data symbols.

Embodiments of the invention provide pilot channel designs for four antenna OFDM.

Various pilot channel designs that might, for example, be employed within the systems of FIGS. 1, 2 and 3 will now be described.

In designing the new pilot designs, consideration is made to the fact that pilot symbols introduce the overhead. As such, from a channel utilization standpoint, fewer pilot symbols is better. For a channel with both frequency and time dispersion, pilot symbols have to be inserted both in frequency and time direction. The spacing between pilot symbols in time direction is determined with consideration to the maximum Doppler frequency, while the spacing between pilot symbols in the frequency direction is determined with consideration to the delay spread of the multi-path fading. In some embodiments, for broadband mobile access application, the channel is updated more frequently both in the frequency direction and in the time direction in order to obtain the correct channel responses across the whole bandwidth during the whole transmission period. To deal with high frequency and time dispersions, a denser pilot grid is preferably employed.

Some embodiments feature a TDD (time division duplex) deployment. To support slot-based TDD switching, in some embodiments, channel estimation processing is performed slot by slot, i.e. the channel responses are calculated only based on the pilot symbols in the current slot.

FIGS. 4 through 16B are examples of pilot designs provided by various embodiments of the invention. In all of these drawings, time is shown on the vertical axis and frequency is shown on the horizontal axis. The small circles each represent the content of a particular sub-carrier transmitted at a particular time. A row of such circles represents the sub-carriers of a single OFDM symbol. A vertical column of any of these drawings represents the contents transmitted on a given OFDM sub-carrier over time. All of the examples show a finite number of sub-carriers in the frequency direction. It is to be understood that the number of sub-carriers in an OFDM symbol is a design parameter and that the drawings are to be considered to give only one example of a particular size of OFDM symbol.

Figure 4A:
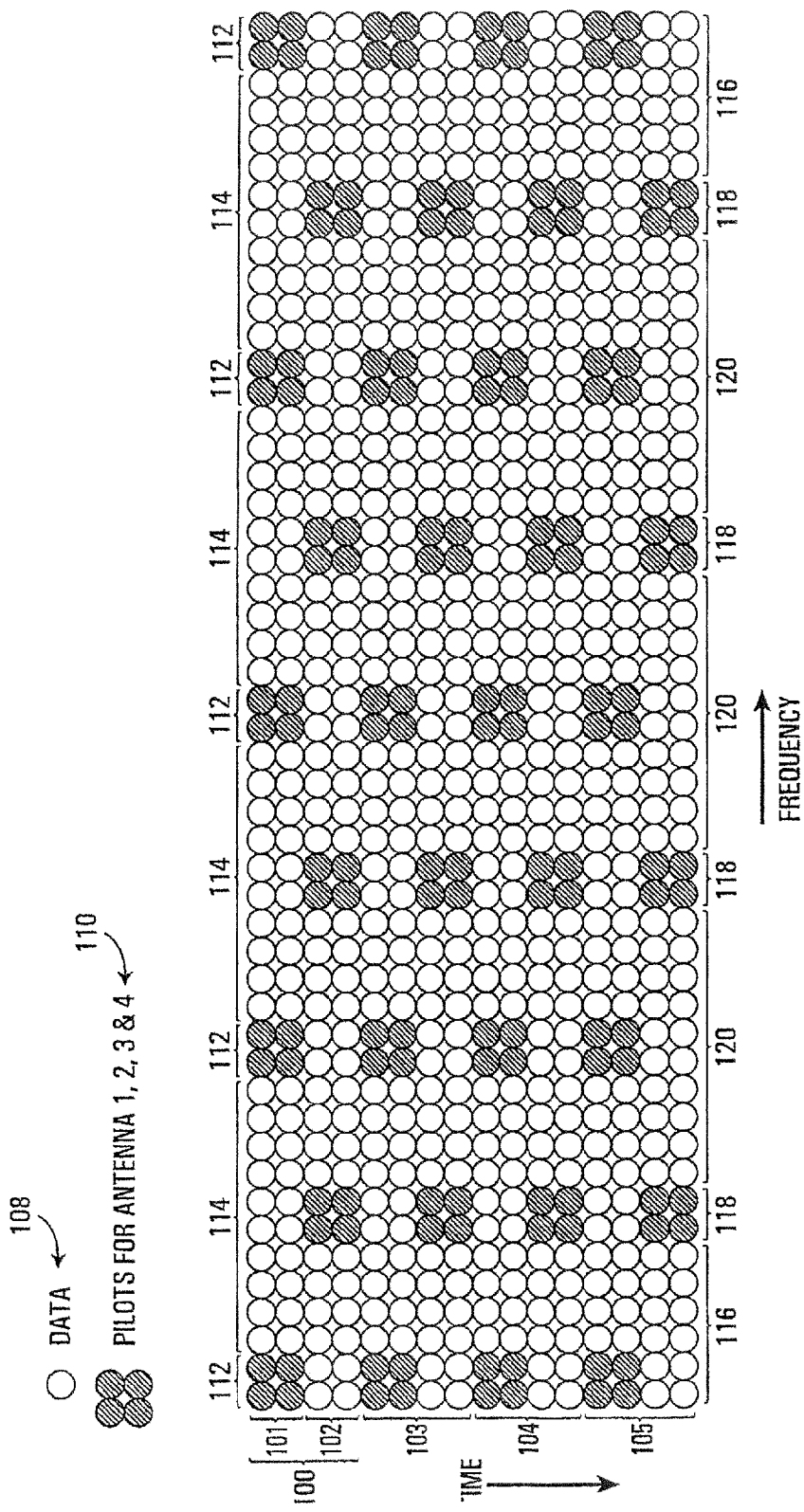
FIGS. 4A, 4B, 5A, 5B, 6, 7A, 7B, 8, 9A, 9B, 10A, 10B, 10C, 11-13, 14A, 14B, 15, 16A, and 16B are time-frequency diagrams of scattered pilot patterns for use with four antenna OFDM systems provided by embodiments of the invention.

Referring now to FIG. 4A, a first example pilot design is shown. With this design, there is a repeating pattern of four OFDM symbols with four such sets of four OFDM symbols indicated at 100,103,104,105. The repeating pattern 100 consists of a first pair of OFDM symbols 101 and a second pair of OFDM symbols 102. During OFDM symbols 101, and in sub-carrier locations 112, pilot symbols for antennas 1, 2, 3 and 4 (indicated at 110 in the legend) are inserted. Between each such block of pilot symbols, there is a block of data sub-carriers 114 (data being indicated at 108 in the legend). In the particular example illustrated, there are 10 data sub-carriers between the blocks of pilot carriers. However, it is to be understood that other numbers could alternatively be employed.

The next set of OFDM symbols 102 is similar to the first set 101 but for the fact that the pattern begins with the set of data sub-carriers and then a set of pilot carriers. The pilot symbols in the second set of symbols 102 are offset from the pilot symbols in the first set 101, by four sub-carriers in the illustrated example. Other offsets are possible.

Each block of pilot symbols includes one pilot for each of the four antennas. The particular location of the pilot symbol for a given antenna in such blocks is not specified in the example of FIG. 4A. Rather, each block must include at least one pilot symbol from each of the four antennas. Various specific examples are given below.

With this design, a TDD transmission scheme is possible with transmission taking place in blocks of multiples of two OFDM symbols.

At the receiver, channel estimation is performed for the pilot locations. Then interpolation is performed in the time direction first followed by interpolation in the frequency direction. The time interpolation is preferably done first because there is likely to be more stability in the time direction. In the illustrated example, the pattern repeats every four OFDM symbols with the second two OFDM symbols having pilot locations offset from the pilot locations in the first pair of OFDM symbols. It can be seen that patterns of other multiples of two OFDM symbols can alternatively be employed. For example, in a repeating pattern containing six OFDM symbols, the pilot symbols would be offset from each other in the second pair and again in the third pair before repeating the pattern again starting at the seventh OFDM symbol. An example of this is given below in FIG. 8.

Figure 4B:
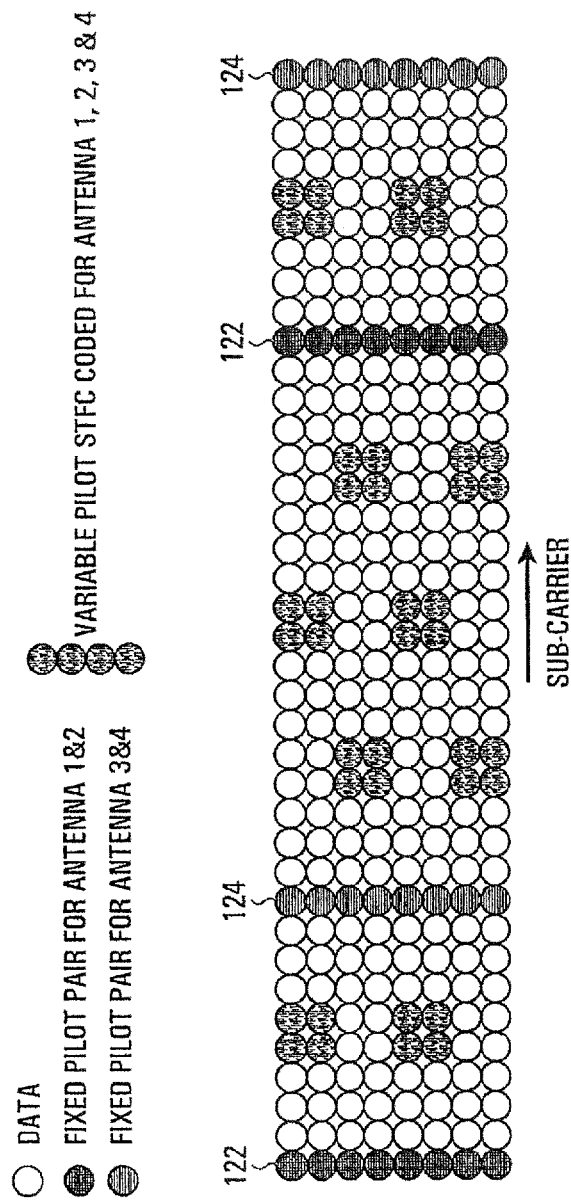

Referring now to FIG. 4B, shown is another example pilot pattern that is very similar to that of FIG. 4A. However, in this example in addition to the four pilot symbol blocks that are inserted each of which consists of a pilot for each of the four antennas, these being inserted in a so called "variable manner" since the pilot symbols for a given antenna are not always on, there are also shown fixed pilot symbols at 122 for a first pair of antennas 1 and 2, and fixed pilot symbols 124 for antennas 3 and 4. In the particular example shown, the repeating pattern consists of a fixed pilot pair for antennas 1 and 2, three data sub-carrier locations, two sub-carrier locations containing variable pilot symbols and data locations; three data sub-carriers; a fixed pilot pair for antennas 3 and 4 followed by 18 sub-carriers containing both data only sub-carriers and variable pilot plus data sub-carriers, another fixed pilot pair for antennas 1 and 2, eight sub-carriers containing data sub-carriers and data plus variable pilot sub-carriers, and another fixed pilot for antennas 3 and 4. It is to be understood that this is a very particular example. The fixed pilots can be inserted anywhere. In some embodiments, they can overlap the variable pilots. Thus, the particular pattern in which there are three data sub-carriers separating the fixed pilot symbols from the variable pilot symbols is to be considered only one possibility.

Figure 5A:
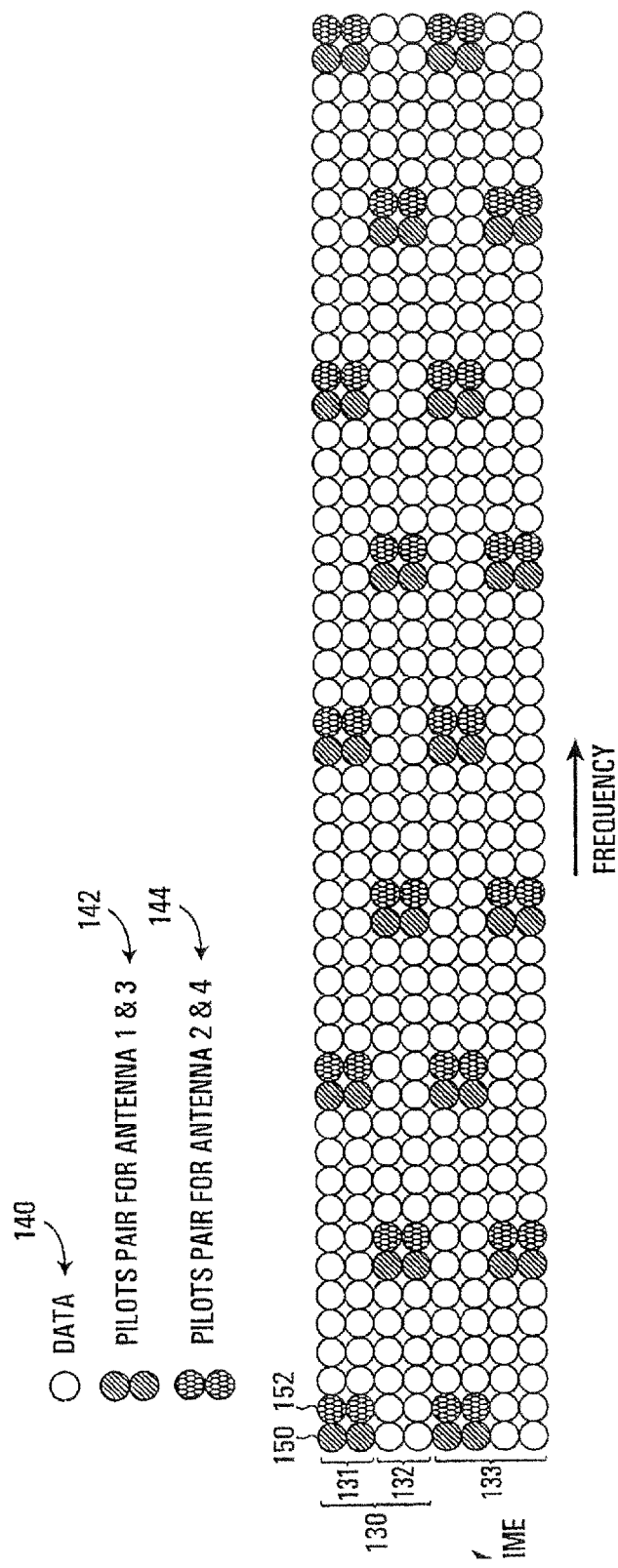

Turning now to FIG. 5A, this is a specific example of the pilot pattern of FIG. 4A. Shown are two sets of four OFDM symbols 130,133 with the first set of four OFDM symbols 130 shown to include a first pair of OFDM symbols 131 and a second pair of OFDM symbols 132. Data sub-carriers are indicated at 140; pilot pairs for antennas 1 and 3 are indicated at 142; pilot pairs for antennas 2 and 4 are indicated at 144. In this embodiment, unlike FIG. 4A where the particulars of the pilot symbols in each four pilot block were unspecified, each block of four pilot symbols is shown to include a first pair 150 for antennas 1 and 3, and the second pair 152 for antenna pair 2 and 4. The pairs are arranged vertically (i.e. in time).

Figure 5B:
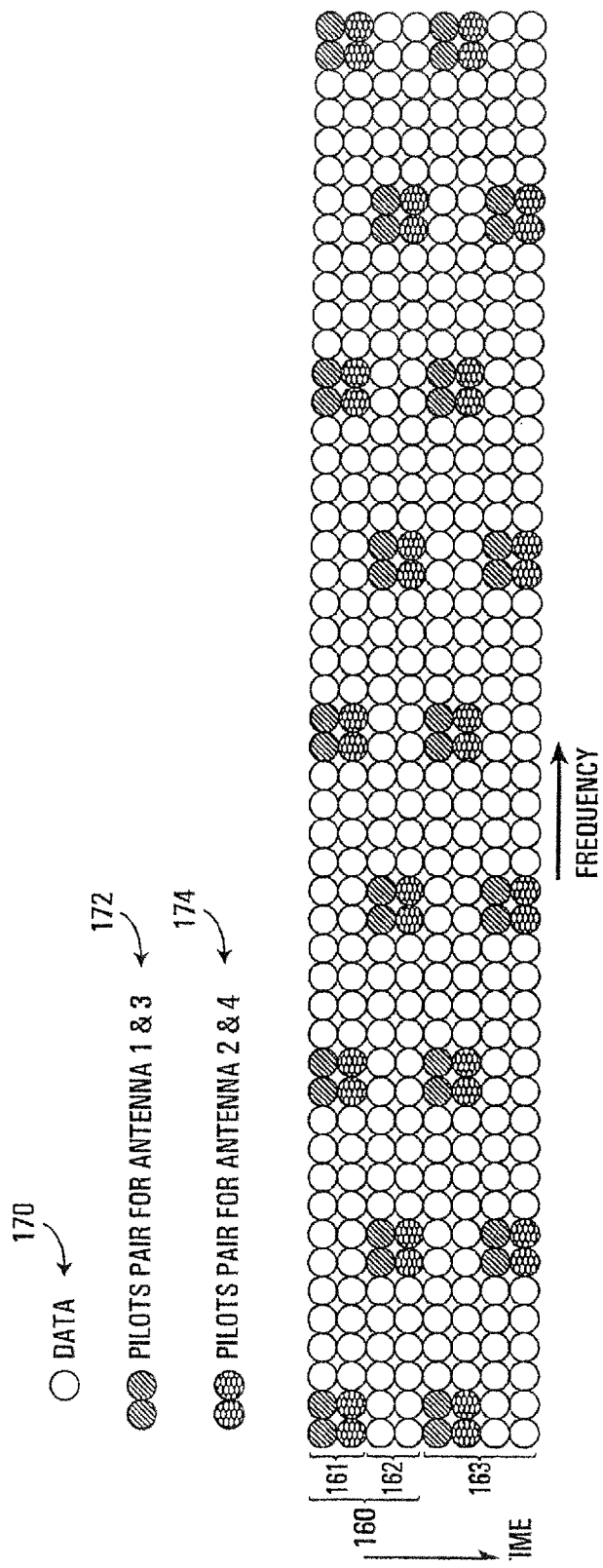

FIG. 5B is very similar to FIG. 5A, but in this example the pilot pairs are arranged horizontally. In the particular example, shown are two sets of four OFDM symbols 160, 163 with OFDM symbol group 160 shown to include two pairs of OFDM symbols 161,162. In these pairs, there is a horizontally (i.e. in frequency) arranged pilot pair for antennas 1 and 3 and a horizontally arranged pilot pair for antennas 2 and 4. In this example, data sub-carriers are indicated at 170, pilot pairs for antennas 1 and 3 are indicated at 172, and pilot pairs for antennas for 2 and 4 are indicated at 174. Yet another possible combination is antennas 1&4, and 2&3.

Figure 6:
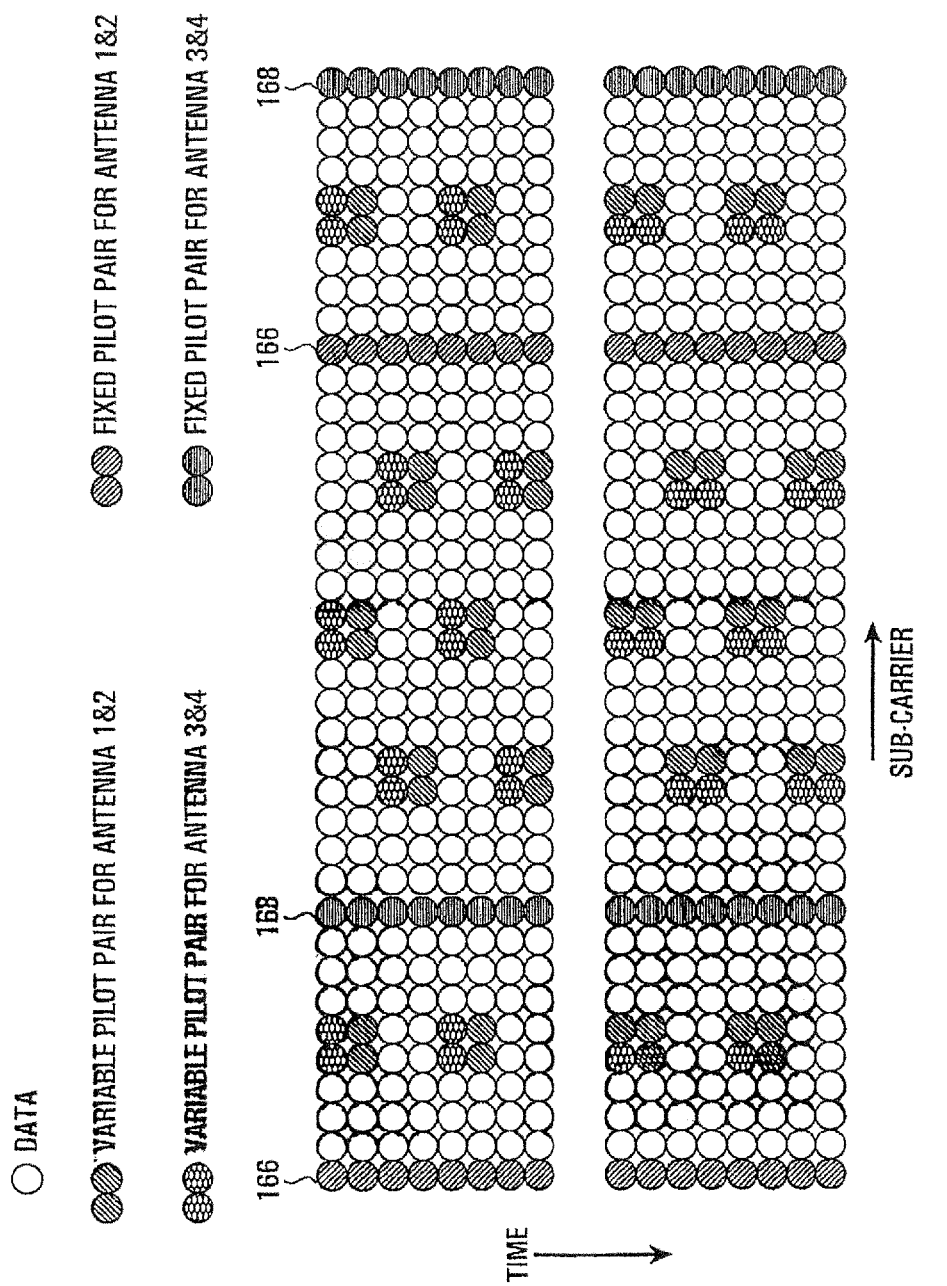

Referring now to FIG. 6, shown is another pilot design provided by another embodiment of the invention. This design features fixed pilot locations 166 for antennas 1 and 2, and fixed pilot locations 168 for antenna pairs 3 and 4. This is similar to the fixed pilot design of FIG. 4B. In this case, for the first eight OFDM symbols, the horizontal pilot pair arrangement of FIG. 5B is used while for the next eight OFDM symbols, the pilot pair layout of FIG. 5A is employed. That is to say in the first OFDM symbols, the pilot pairs for a given antenna pair are arranged horizontally (i.e. in frequency) and during the next eight OFDM symbols, the pilot pair for a given antenna pair is arranged vertically (i.e. in time).

The pilot designs described with reference to FIGS. 5A, 5B and 6 have a specified pilot pair locations for antenna pairs, but have not been particular as to the location of a given pilot for a given antenna. In the example of 7A, the pilot design is specified to this degree of granularity. In particular, with this example, again four repeating patterns of four OFDM symbols are shown at 180,183,184 with the first set of four OFDM symbols 180 consisting of a first pair of OFDM symbols 181 and a second pair of OFDM symbols 182. Blocks of pilot symbols are inserted in time and frequency in a manner the same as that shown in FIG. 4A.

Here, each set of four pilot symbols is shown to include a pilot symbol for antenna 1 192, a pilot symbol for antenna 2 194, a pilot symbol for antenna 3 196, and a pilot symbol for antenna 4 196 arranged in a particular manner. Data sub-carriers are indicated at 190.

Figure 7A:
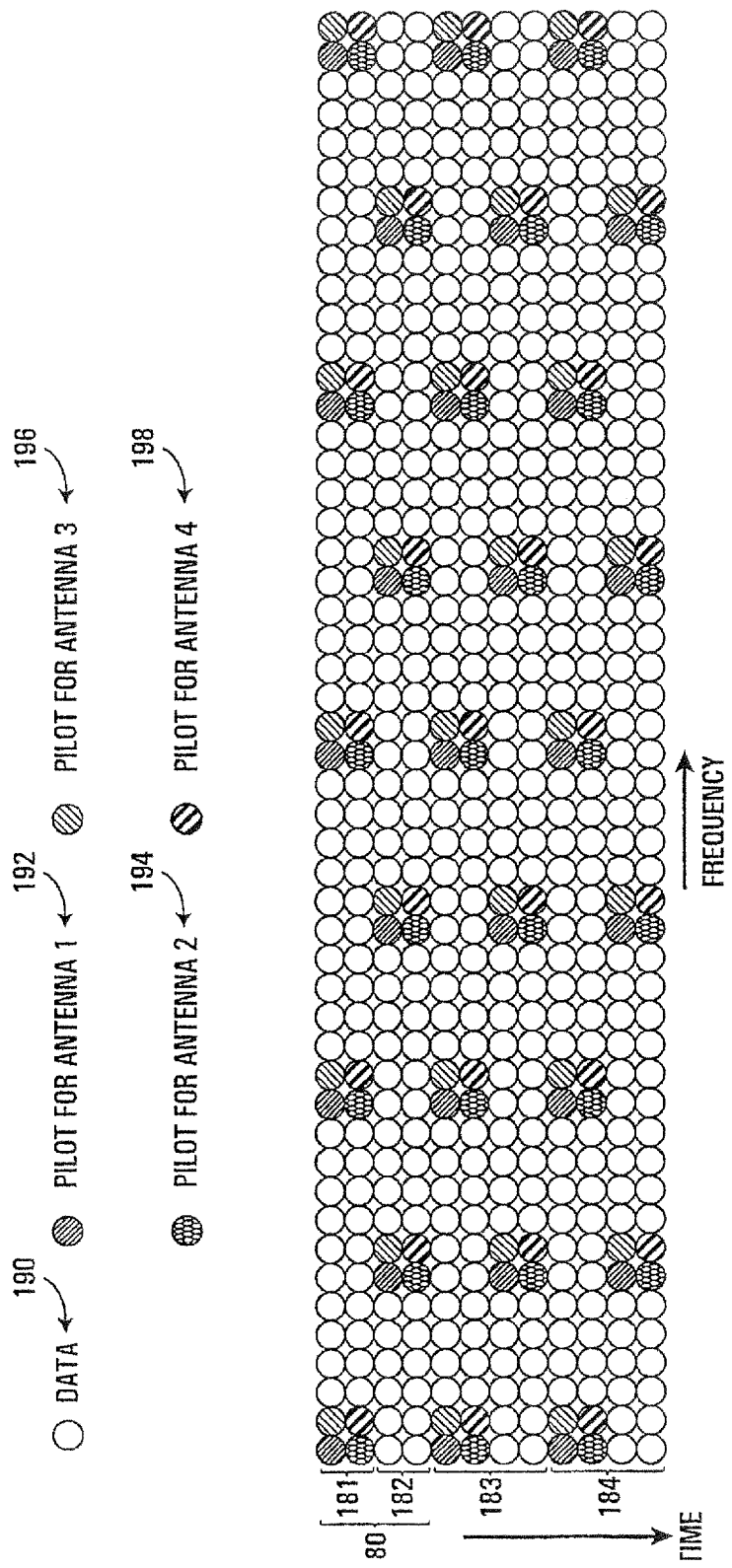
Figure 7B:
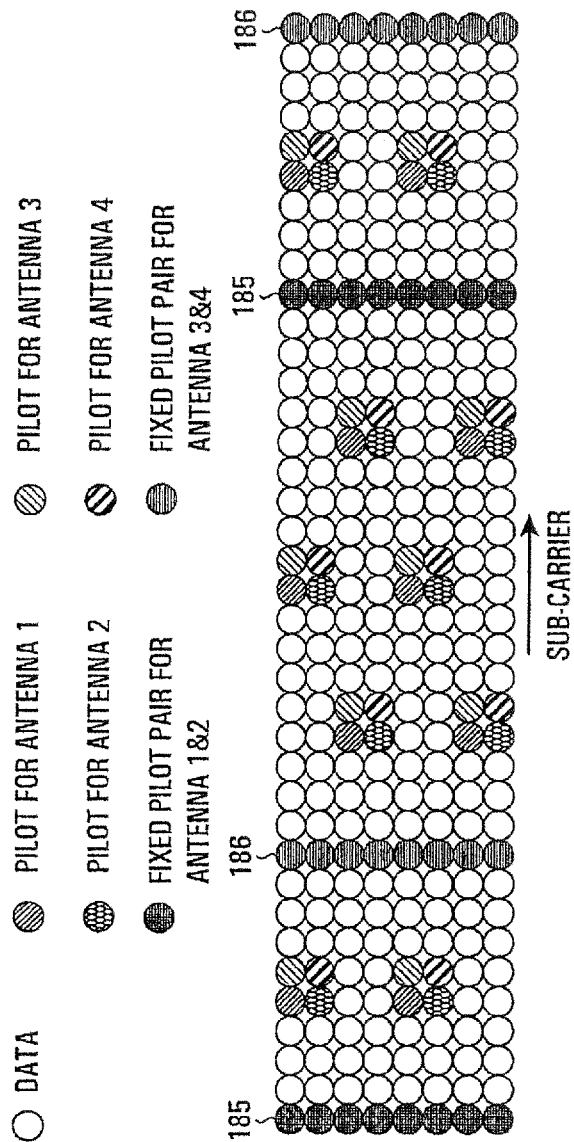

Referring now to FIG. 7B, this pilot design is similar to that of FIG. 7A in that each block of four pilot symbols has specified locations for the pilot symbols for each of the four antennas. This design also features a fixed pilot 185 for antennas 1 and 2 and a fixed pilot symbols 186 for antennas 3 and 4. There are also different antenna combination possibilities for fixed pilots as described previously for the variable pilots.

Figure 8:
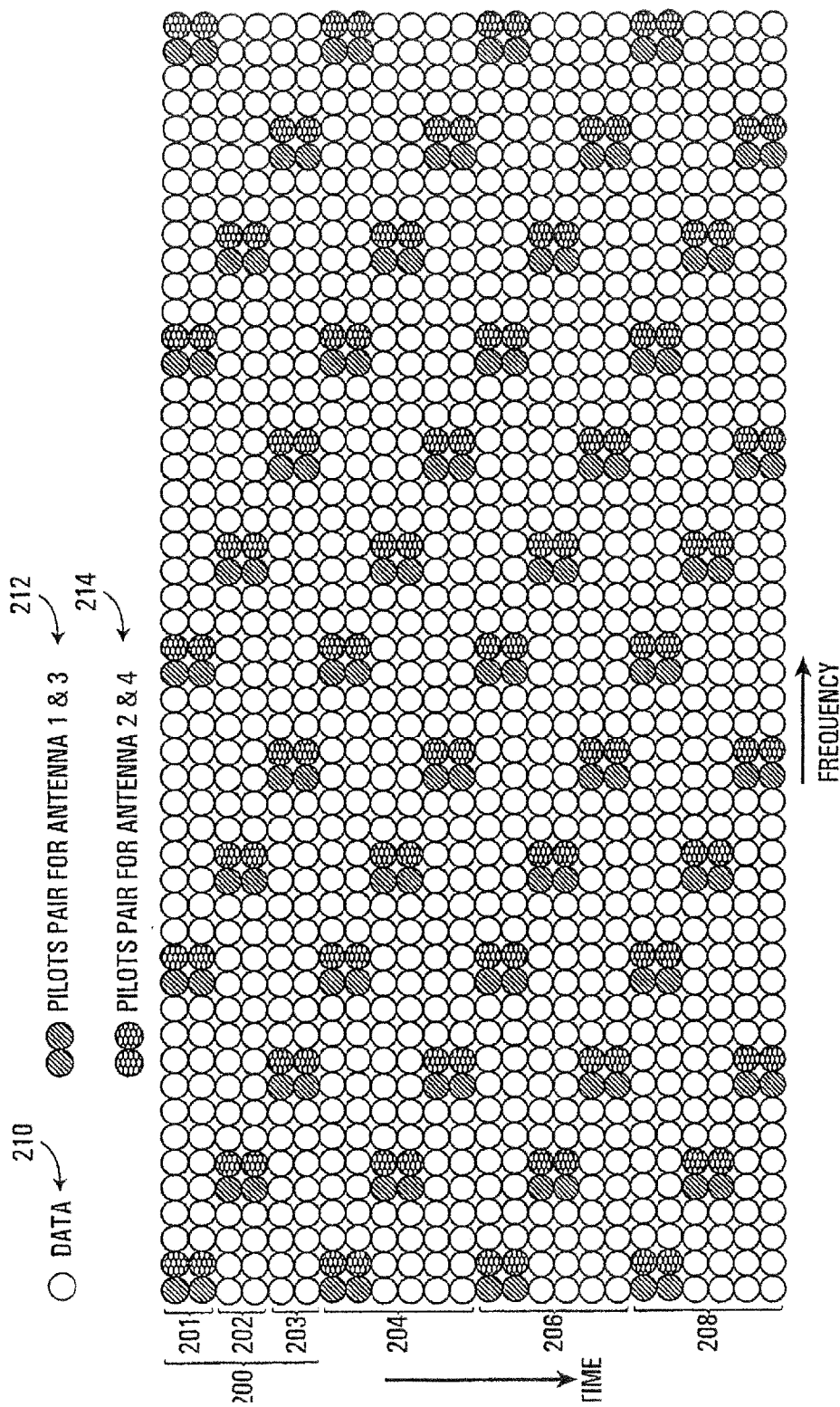

Turning now to FIG. 8, shown is another pilot design in which the layout has a repeating pattern every six OFDM symbols. Four sets of OFDM symbols are shown at 200, 204,206,208. The first set 200 is shown to include three pairs of OFDM symbols 201,202,203. In this example, the three pairs of OFDM symbols 201,202,203 have blocks of four pilot symbols inserted but in offset locations from each other. Thus, the four pilot blocks in OFDM symbols 202 are offset from those of OFDM symbols 201, and the four pilot blocks of OFDM symbols 203 are again offset from those of OFDM symbols 202. In this particular case, there is a repeating pattern consisting of two sub-carriers during which variable pilot symbols and data are transmitted, two sub-carriers during which only data followed by sub-carriers during which only data are transmitted. Data is indicated at 210; pilot symbols for antennas 1 and 3 are indicated at 212; pilot symbols for antennas 2 and 4 are indicated at 214. It can be seen that the arrangement of the pilot symbols within the four pilot symbols block has pilot pairs for a given pair of antennas arranged vertically, i.e. in time. It is to be understood that the same six OFDM symbol pattern can be employed but with different layouts for the pilots in the four pilot blocks. These pilot blocks can be made of horizontally arranged pairs, or have some other fixed or variable design. Furthermore, while the example shows two data sub-carriers between each pair of sub-carriers that contain the variable pilot symbols, other separations can alternatively be employed.

Figure 9A:
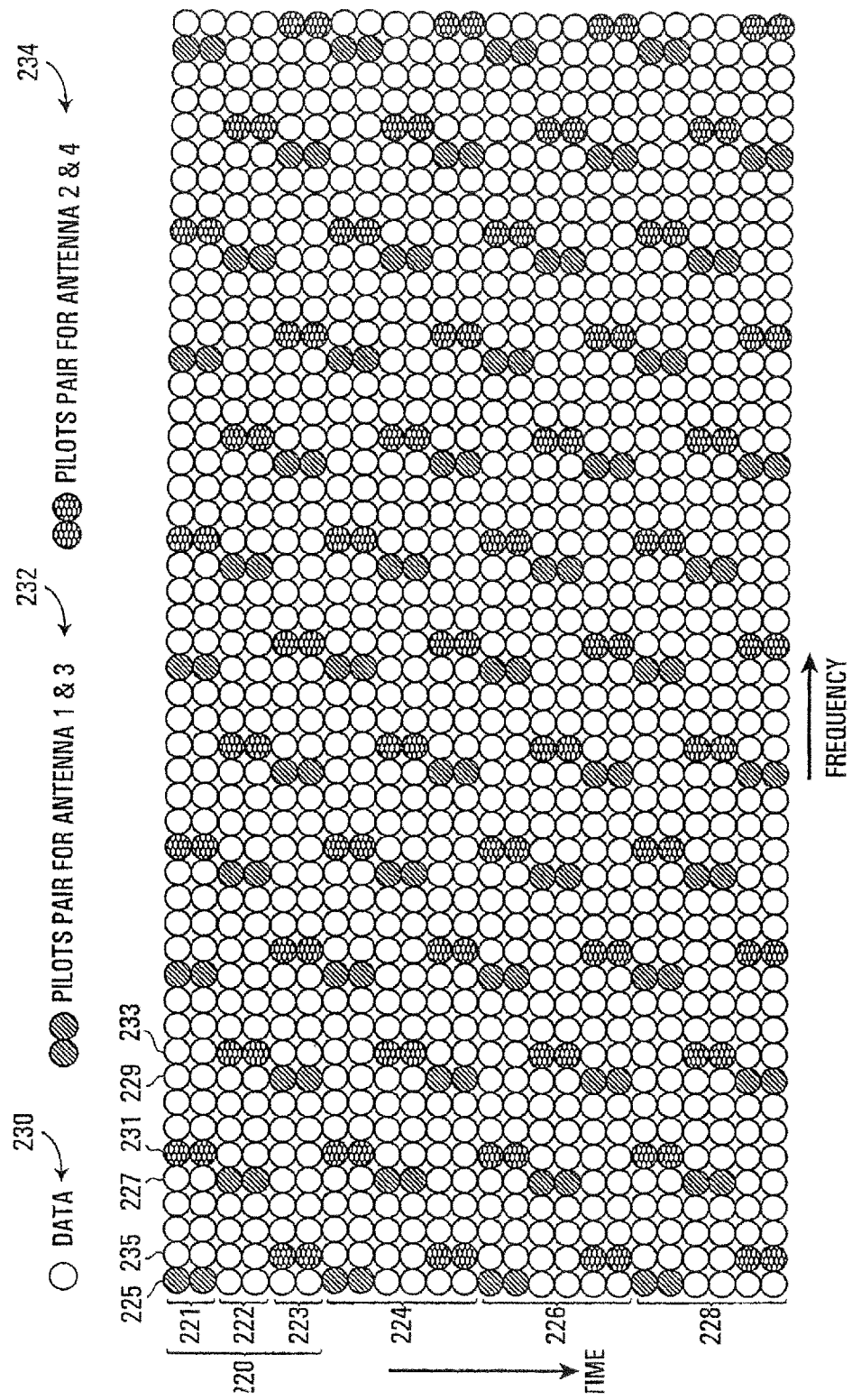

Another pilot design is shown in FIG. 9A. This design also features a six OFDM symbol repeating pattern with four such groups of six OFDM symbols indicated at 220,224, 226,228. The six OFDM symbols 220 are shown to include three pairs of OFDM symbols 221,222,223. With this design, the pilot symbols for the four antennas are not arranged in square blocks of four. Rather, as can be seen from the layout of data 230, pilot symbols for antennas 1 and 3 232 and pilot symbols for antennas 2 and 4 234, the pilot symbols for antennas 1 and 3 are inserted at a first sub-carrier location 225 for the first pair of OFDM symbols; at a second sub-carrier location 227 for the second pair of OFDM symbols 222; and a third sub-carrier location 229 for the third pair of OFDM symbols 223. These sub-carrier locations are offset from each other by three OFDM sub-carrier locations. This pattern then repeats itself both in the horizontal and vertical direction. Similarly, pilot pairs for the second pair of antennas 2 and 4 are inserted at sub-carrier 231 for the first pair of OFDM symbols, sub-carrier 233 for the second pair of OFDM symbols and sub-carrier 235 for the third pair of OFDM symbols 223. This pattern then also repeats in time and frequency. It can be seen that the pilot pairs for the pairs of antennas are arranged vertically (i.e. in time) but that the pilot pairs for the two pairs of antennas are not arranged adjacent to each other. Of course, other antenna combinations are possible.

Figure 9B:
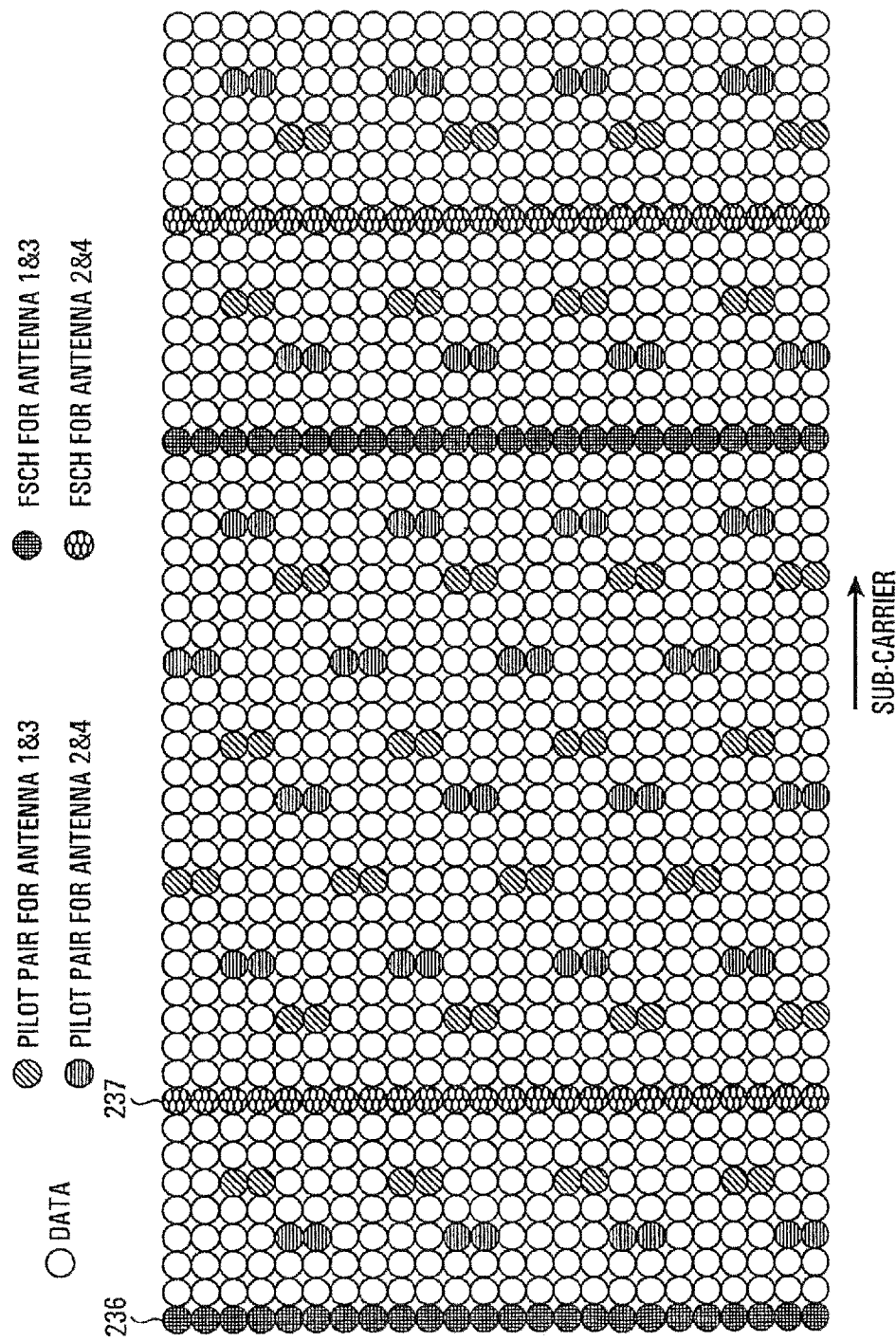

Another example is shown in FIG. 9B. A similar scattered pilot is shown for the four antennas, but this example also includes fixed fast signalling channel pilots (FSCH) 236 for antennas 1 and 3, and 237 for antennas 2 and 4. A fast signalling channel is analogous to a transmission parameter channel described earlier.

Figure 10A:
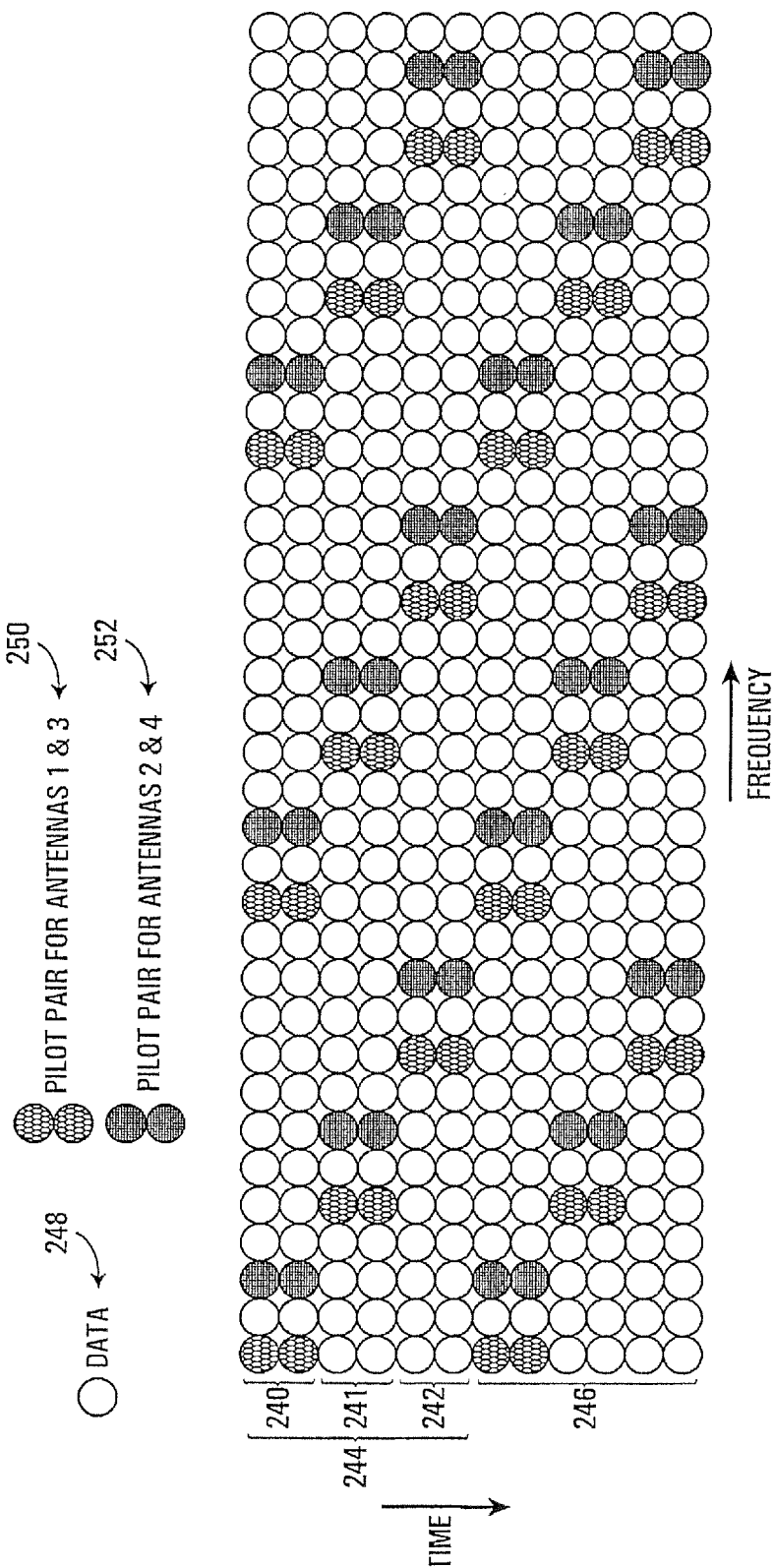

The particular location of the pilot pairs shown in FIGS. 9A and 9B are to be considered a particular example. Another example is shown in FIG. 10A. This design is basically the same as that of FIG. 9A but with the location of the pilot pairs being slightly different. The location of the pilot pairs for antennas 1 and 3 is identical to that of FIG. 9A. In this case, the pairs for antennas 2 and 4 are offset from the pairs for antennas 1 and 3 by one sub-carrier location whereas they were offset by four sub-carrier locations in the example of FIG. 9A. In the particular example shown, there are two groups of six OFDM symbols 244,246 that contain repeating patterns of pilot symbols. The first set of six OFDM symbols 244 contains pairs 240,241,242. Data sub-carriers are indicated at 248; pilot symbols for antennas 1 and 3 are indicated at 250 and pilot symbols for antennas 2 and 4 are indicated at 252. Vertical pilot pair arrangements similar to those of in FIGS. 9A and 10A can also be applied to the situation which features 4 OFDM symbol repeating pattern, and more generally a multiple of 2 OFDM symbols.

In some embodiments, a different pilot pattern is employed by different base stations. This allows the pilot pattern of a given base station to be transmitted and received with higher reliability than would be the case if all base stations were transmitting on the same exact pilot patterns. The illustrated example shows eight different patterns that can be assigned to base stations. These patterns can be fixed or varying over time for a given base station. Of course the particular pattern shown are to be considered only particular examples. More generally, in this embodiment, different pilot patterns are employed for different base stations.

Figure 10B:
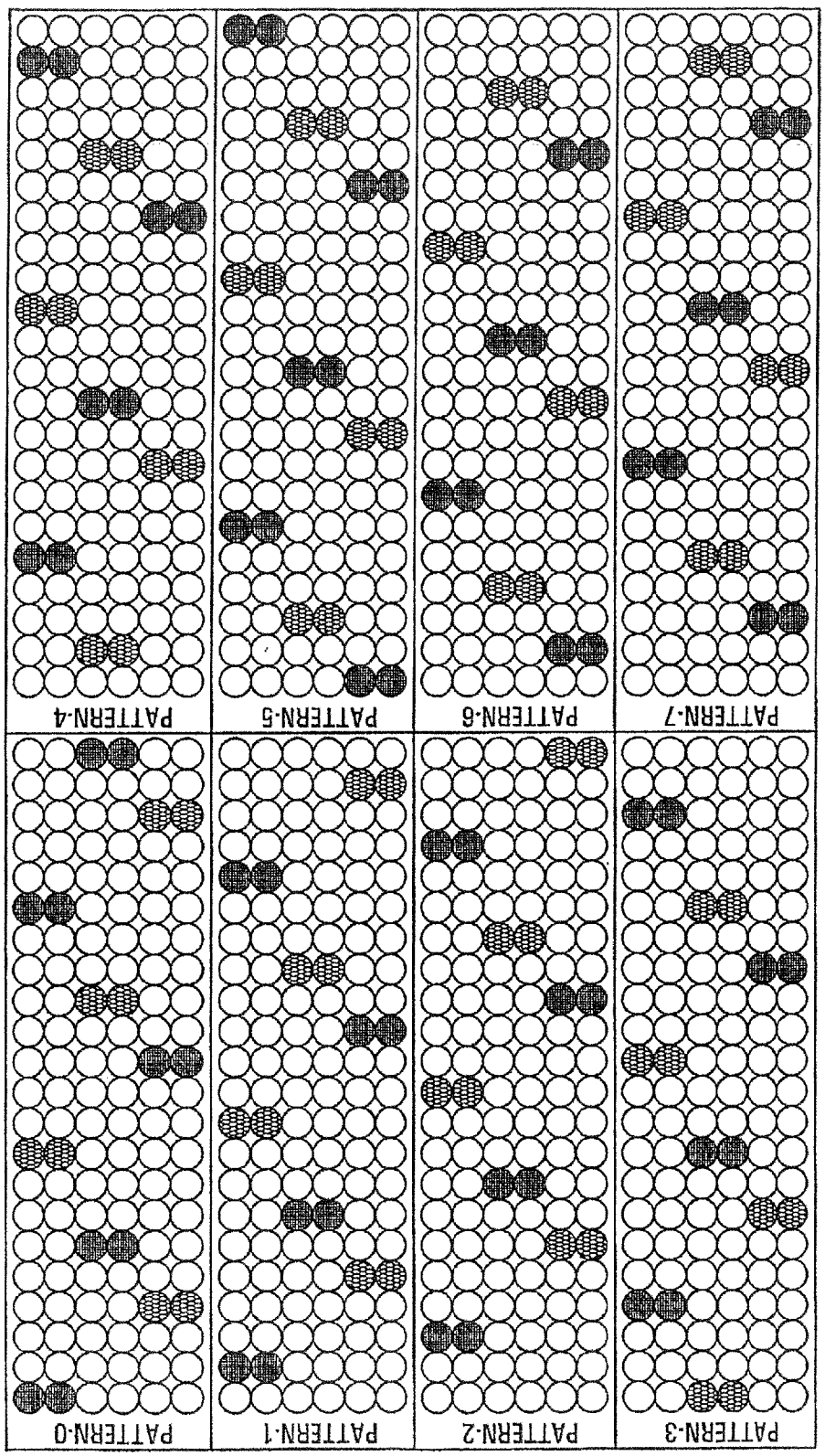
Figure 10C:
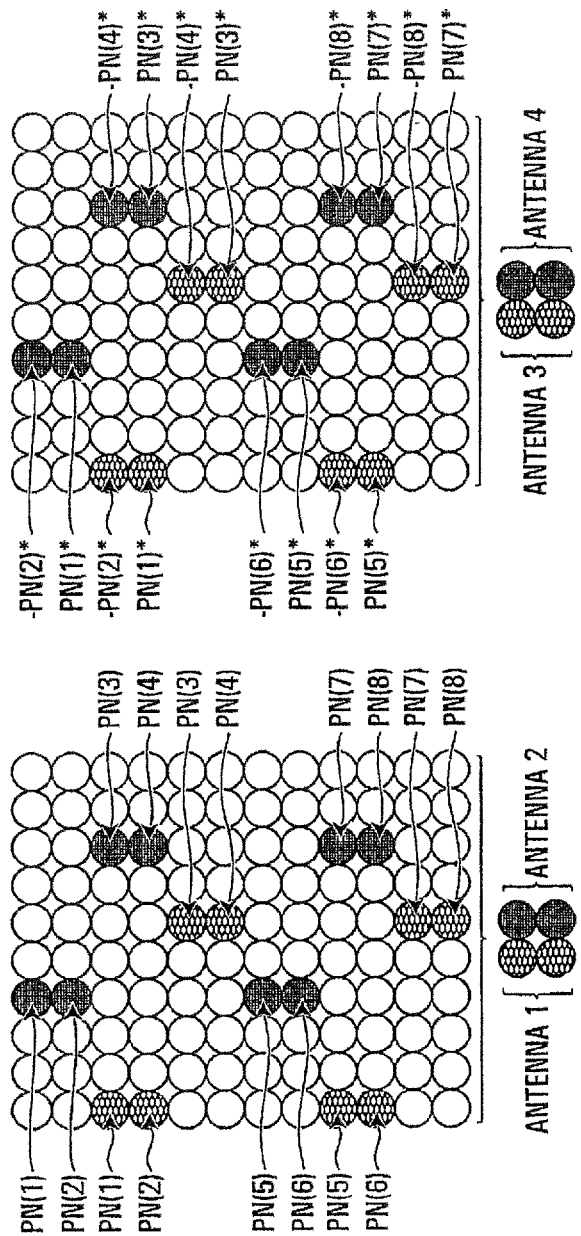

FIG. 10C shows a particular example of how a PN sequence can be mapped to a four antenna pilot.

In one example, an offset pattern of the scattered pilot may be derived from $[ID_{cell}]modulo8$, where $ID_{cell}$ is a positive integer assigned by MAC to identify the BS sector. In one embodiment, there are 8 orthogonal scattered pilot offset patterns. In addition, the scattered pilot pattern allows the fast pilot extraction by using sub-FFT instead of the full size FFT to reduce the portal device power consumption. The FSCH can be demodulated and by using decision feedback the FSCH can be converted into additional pilots to assist the channel estimation. The scattered pilot pattern for 4 transmit antennas can be used for 2 transmit antennas to increase the pilot density in the excessive delay spread environment, e.g. ITU VB channel.

The table below lists example orthogonal scattered pilot patterns.

| | Pattern-0 (i = 0) | Pattern-1 (i = 1) | Pattern-2 (i = 2) | Pattern-3 (i = 3) | Pattern-4 (i = 4) | Pattern-5 (i = 5) | Pattern-6 (i = 5) | Pattern-7 (i = 5) |
|---|---|---|---|---|---|---|---|---|
| OFDM Pair-1 $\{N^i_{OFFSET}(0)\}$ | 0 | 1 | 2 | 3 | 4 | 5 | 6 | 7 |
| OFDM Pair-2 $\{N^i_{OFFSET}(1)\}$ | 5 | 6 | 7 | 8 | 9 | 10 | 11 | 12 |
| OFDM Pair-3 $\{N^i_{OFFSET}(2)\}$ | 11 | 12 | 13 | 14 | 15 | 16 | 1 | 2 |

The scattered pilot pattern may be defined as:

$$SP^i_{k_1}(m) = N^i_{OFFSET_{k_1}}(m) + 16P_k$$

$$SP^i_{k_2}(m) = N^i_{OFFSET_{k_2}}(m) + 16P_k$$

$$N^i_{OFFSET_{k_1}}(m) = (N^0_{OFFSET}(m) + i) \bmod 16$$

$$N^i_{OFFSET_{k_2}}(m) = (N^i_{OFFSET}(m) + 8) \bmod 16$$

where:

$SY^i_{k_1}$ is the sub-carrier index of variable-location pilots for antennas 1&3;

$SP^i_{k_2}$ is the sub-carrier index of variable-location pilots for antennas 2&4;

$N^i_{OFFSET}(m)$ is the sub-carrier indices offsets for $m^{th}$ OFDM-pair and $i^{th}$ rotation pattern;

M=[0,1,2] is a modulo 3 function of the OFDM-pair;

$P_k$=[0,1,2 . . . , $N_{varLocPilot}$−1], $N_{varLocPilot}$ is the number of variable location pilots for each antenna-pair; and I=[0,1,2, . . . 11] is the pilot pattern index.

An example cyclic shift scattered pilot pattern is shown in FIG. 10B as discussed above.

The scattered pilot may be concatenated or mapped by STTD (space-time transmit diversity) code and cell/sector/beam specific PN sequence. An example mapping of the STTD code for the scattered pilot is shown in FIG. 10C as discussed above.

The STTD encoding of the scattered pilot allows assisting receiver specific operations such as average channel estimation over two OFDM symbols. The PN encoded scattered pilot allows inter-cell interference averaging, fine timing synchronization and cell/sector/beam identification, and channel quality indicator estimation, for instance.

Illustrative example scattered pilot parameters for 2048-OFDM with 20 MHz bandwidth are listed in the table below.

| Parameter | Value |
|---|---|
| Number of dc carriers | 1 |
| Number of guard carriers, left | 159 |
| Number of guard carriers, right | 160 |
| $N_{used}$, Number of used carriers | 1728 |
| Total number of carriers | 2048 |
| Number of variable-location pilot | 288 (for 4 transmit antennas); 144 (for 2 transmit antennas) |
| Number of data carriers | 1440 (for 4 transmit antennas) 1584 (for 2 transmit antennas) |
| Number of FSCH carriers | 108 |
| Number of variable-location pilots which coincide with FSCH | 108 (for 4 transmit antennas) 54 (for 2 transmit antennas) |
| Number of FSCH patterns | 8 |
| The frequency offset indices of FSCH sub-carriers | 32n + 4k & 32n + 4k + 1 n = 0, 1, . . . , 53; k = 0, 1, . . . , 8 |

Figure 11:
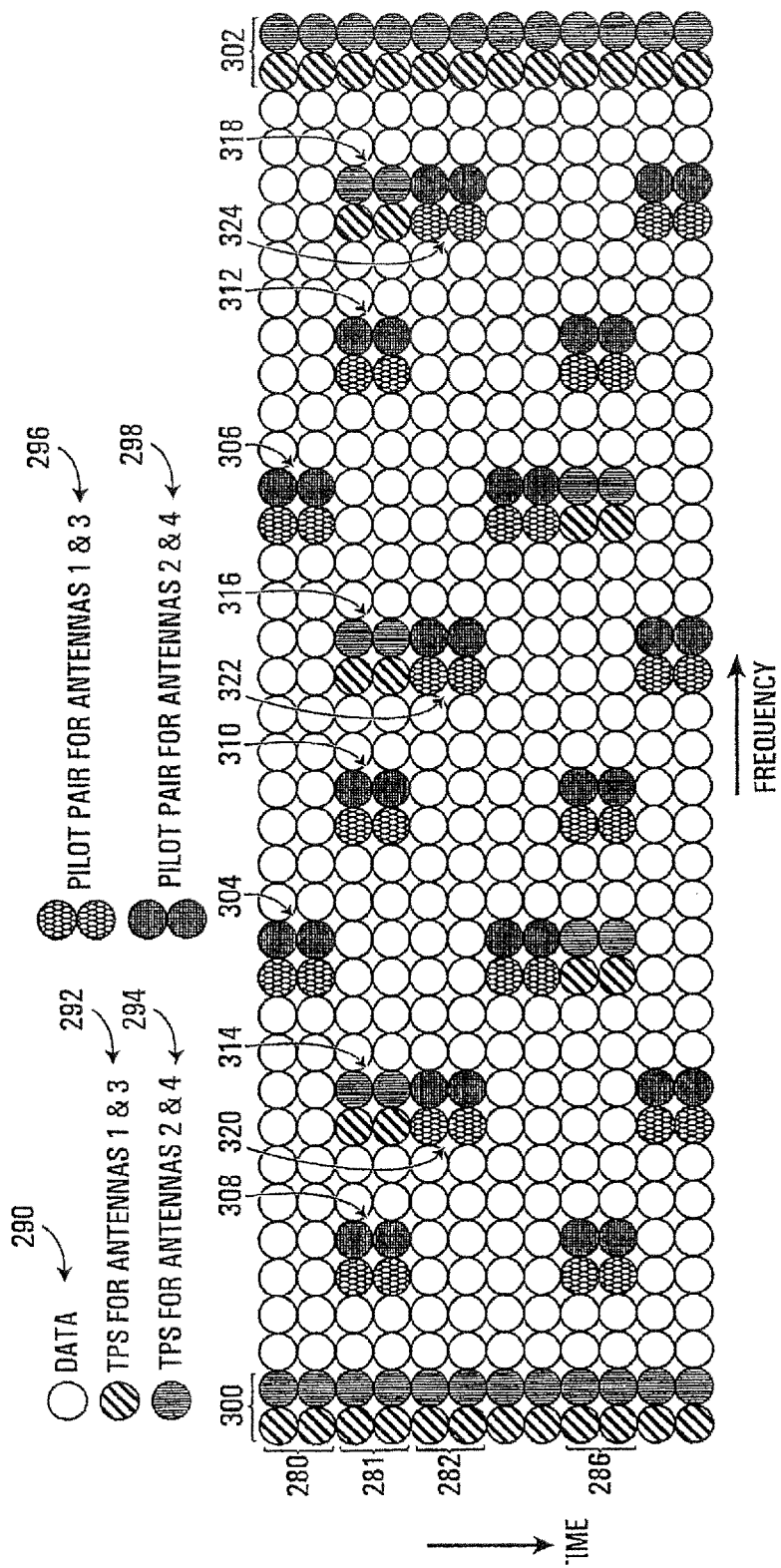

Referring now to FIG. 11, shown is another example pilot design that in addition to including pilot pairs for the various antennas, includes TPS (transmission parameter signals) locations. These can be used to transmit signalling information and/or information characterizing the transmissions.

In the particular example illustrated, there is a repeating pattern of 12 OFDM symbols. The first six OFDM symbols consist of pairs 280,281,282. The first two sub-carriers 300 are used for TPS for antennas 1 and 3 and TPS for antennas 2 and 4 respectively. Similarly, the last two sub-carriers 302 are used for this same purpose. Between the two pairs of sub-carriers used for TPS, there is an arrangement in which blocks of four pilot symbols are inserted similar to the layout of FIG. 8 with two data sub-carriers separating each variable pilot sub-carrier location. The first pair of OFDM symbols 280 has pilot blocks 304,306; the second pair of OFDM symbols 281 has pilot blocks 308,310,312; and third pair of OFDM symbols 282 has pilot blocks 320,322,324. In this particular example, in addition to the pilot blocks laid out as described above, there are TPS blocks 314,316,318 inserted in the second OFDM symbol pair 281. Similar TPS blocks are inserted in OFDM symbol pair 286 but in a different frequency location. These TPS blocks are used to transmit additional TPS information. Preferably, the additional TPS blocks are of sufficient reliability that they can be decoded accurately. Assuming accurate decoding of these TPS blocks can be achieved, then these sub-carrier locations can also be treated as pilot symbols for the purpose of channel estimation. It is most likely that proper decoding of the TPS blocks will occur if the TPS blocks are situated proximal to, and preferably adjacent to pilot blocks as shown in the illustrated example. More preferably, each TPS block is arranged adjacent in time to a pilot block. This is because typically the channel will change less in the time direction than in the frequency direction and this will further enhance the reliability of the decoding performed for the TPS block.

A particular pilot and TPS block layout has been shown in FIG. 11. More generally, in any of the embodiments described herein TPS blocks may be inserted in any location, preferably proximal to the location of pilot insertions. At the receiver, both the pilot blocks and the TPS blocks can be used as input to the interpolation process that yields channel estimates for all sub-carriers and all OFDM symbols. In a particular example shown, the vertical arrangement of pilot symbols for antenna pairs is shown. This same arrangement is used for the TPS data. Thus, it is preferred that the TPS for a given antenna be inserted in the same sub-carrier location as a pilot for the same antenna.

Figure 12:
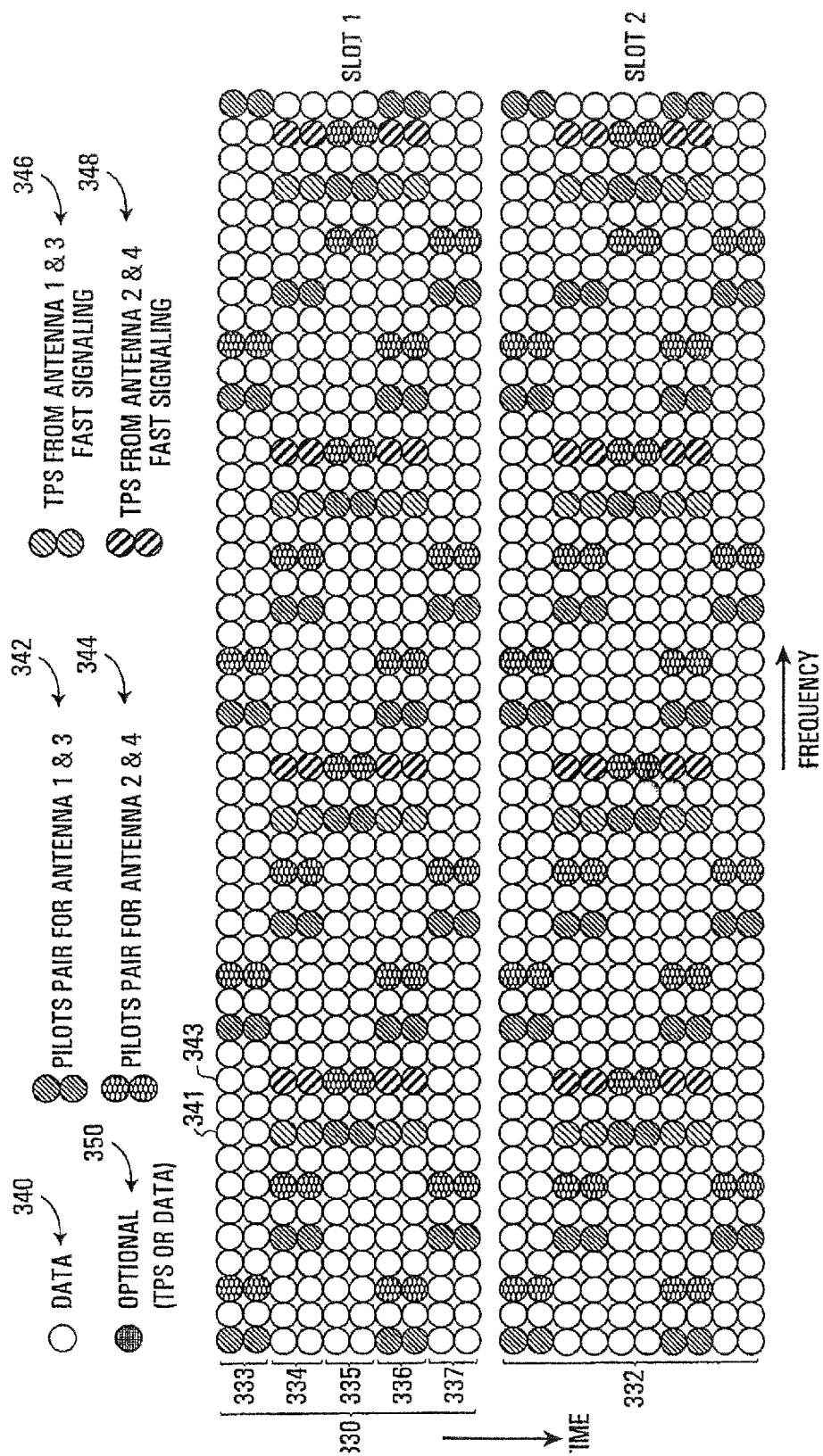

Referring now to FIG. 12, in another example of a pilot pattern that includes TPS, the basic pilot layout is very similar to that shown in FIG. 10 with the pilot pairs for the two sets of antennas being offset from each other by one sub-carrier location and then further offset from each other during adjacent pairs of OFDM symbols. In the illustrated example, the repeating pattern is 10 OFDM symbols long with two such patterns indicated at 330,332. OFDM symbol 330 consists of five pairs of OFDM symbols 333,334,335, 336,337. Data sub-carriers are indicated at 340; pilot pairs for antennas 1 and 3 at 342; pilot pairs for antennas 2 and 4 at 344; TPS from antennas 1 and 3 at 346; TPS for antennas 2 and 4 at 348. In this example, it can be seen that during OFDM symbols 334,336 TPS signalling is inserted adjacent in time to the pilot pair insertions during OFDM symbols 335. This is seen at sub-carrier 341 which consists of two OFDM symbol durations during which data is transmitted; two OFDM symbol durations during which TPS from antennas 1 and 3 is transmitted; two OFDM symbol durations during which pilot data for antennas 1 and 3 is transmitted; and two OFDM symbol durations during which TPS data for antennas 1 and 3 is transmitted followed by two more OFDM symbol durations during which data is transmitted. A similar pattern is shown at 343 for antennas 2 and 4. This is another example similar to that of FIG. 11 in which TPS data is inserted adjacent in time to the insertion of pilot pairs. Once again, the TPS data, if reliably encoded and reliably decoded at the receiver can be used as further pilot locations for the purpose of channel estimation.

Figure 13:
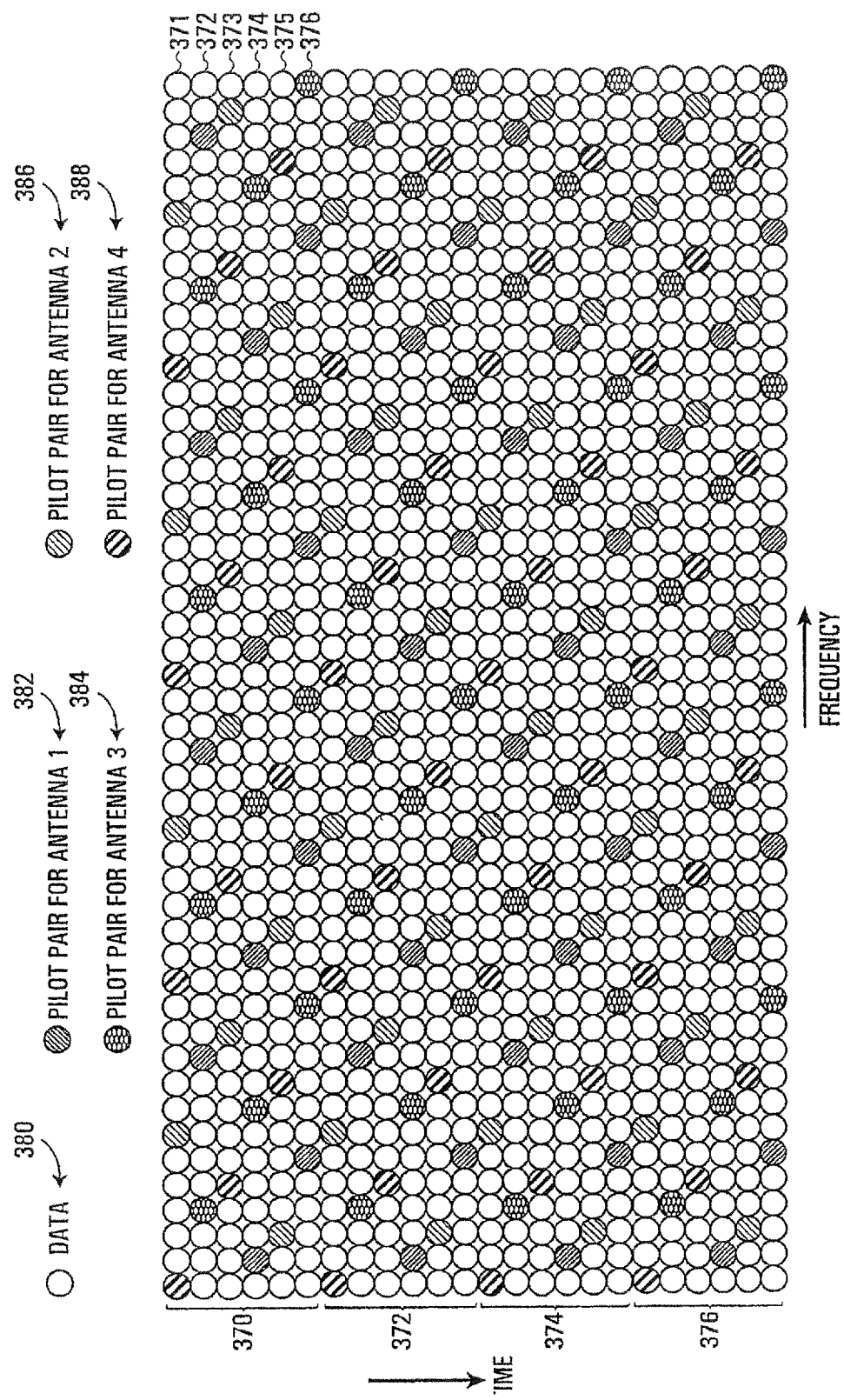

Examples have now been shown in which the pilot symbols are arranged in square blocks of four, and in pairs of separated blocks of two pilot symbols. The embodiment of FIG. 13 differs from these in that the pilot symbols for the antennas are all separate from each other. The data sub-carriers are indicated at 380; pilot symbols for antenna 1 at 382; pilot symbols for antenna 3 at 384; pilot symbols for antenna 2 at 386; pilot symbols for antenna 4 at 388. Shown is a repeating pattern of six OFDM symbols with four such patterns indicated at 370,372,374,376. In this repeating pattern, there is a scattered pilot for each of the four antennas but in locations offset from each other. For example, during the first set of six OFDM symbols 370, pilot symbols 382 for the first antenna are inserted in a scattered manner in OFDM symbols 372,374,376. Pilot symbols 386 for the second antenna are inserted during OFDM symbols 371,373,375. Pilot symbols 384 for the third antenna are inserted during OFDM symbols 372,374,376. Finally, pilot symbols 388 for the fourth antenna are inserted in OFDM symbols 371,373, 375. In this particular example, the pilot symbols inserted for a given antenna are separated in frequency by 11 sub-carriers. Every second OFDM symbol contains pilot symbols for each antenna. Of course it is to be understood that different pilot densities than those particularly shown in FIG. 13 may alternatively be employed. Furthermore, while the example of FIG. 13 shows a repeating pattern of six OFDM symbols, the concept of using separately scattered pilot symbols for each antenna can be equally applied to patterns having different lengths.

Figure 14A:
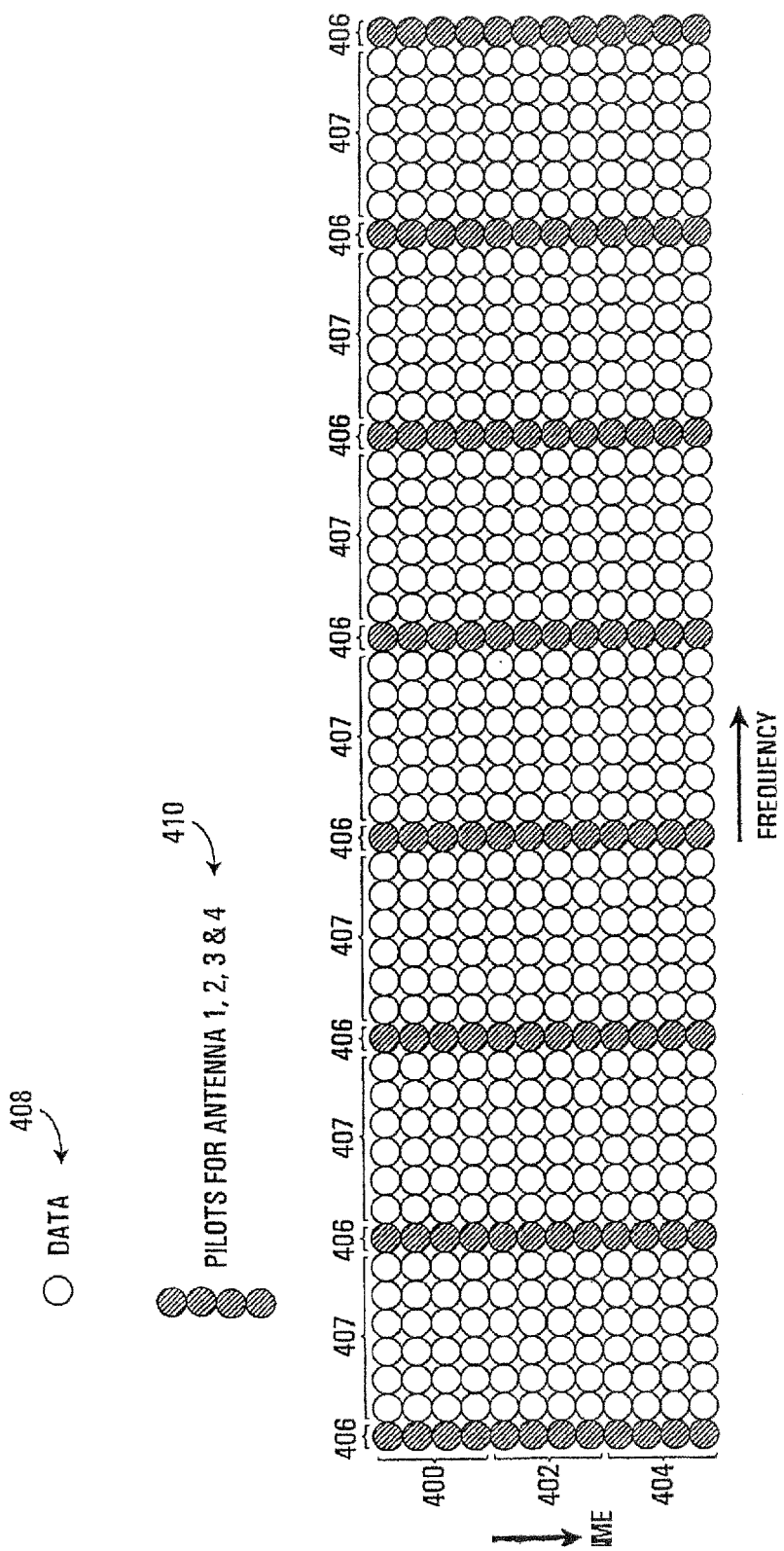

Referring now to FIG. 14A, shown is another pilot design provided by another embodiment of the invention. This pilot design repeats in patterns of four OFDM symbols with three sets of four OFDM symbols indicated at 400,402,404. During each set of four OFDM symbols, a set of four pilot symbols are inserted in a vertical manner for the four antennas. Data symbols are indicated at 408 and pilot symbols at 410. In the pattern shown, in sub-carrier locations 406, the sets of four pilot symbols are inserted with one pilot for each antenna, the location of the particular sub-carriers for particular antennas not being specified. Thus, sub-carrier locations 406 are transmitted during which no data is transmitted. Between sub-carriers 406 are blocks of data sub-carriers 407 six in length. In the particular example, the vertical pilot insertions is periodic being inserted every seventh sub-carrier. It is to be understood that other spacings can be employed. Furthermore, the spacings do not necessarily need to be uniform so long as the receiver knows where the pilot symbols are located.

Figure 14B:
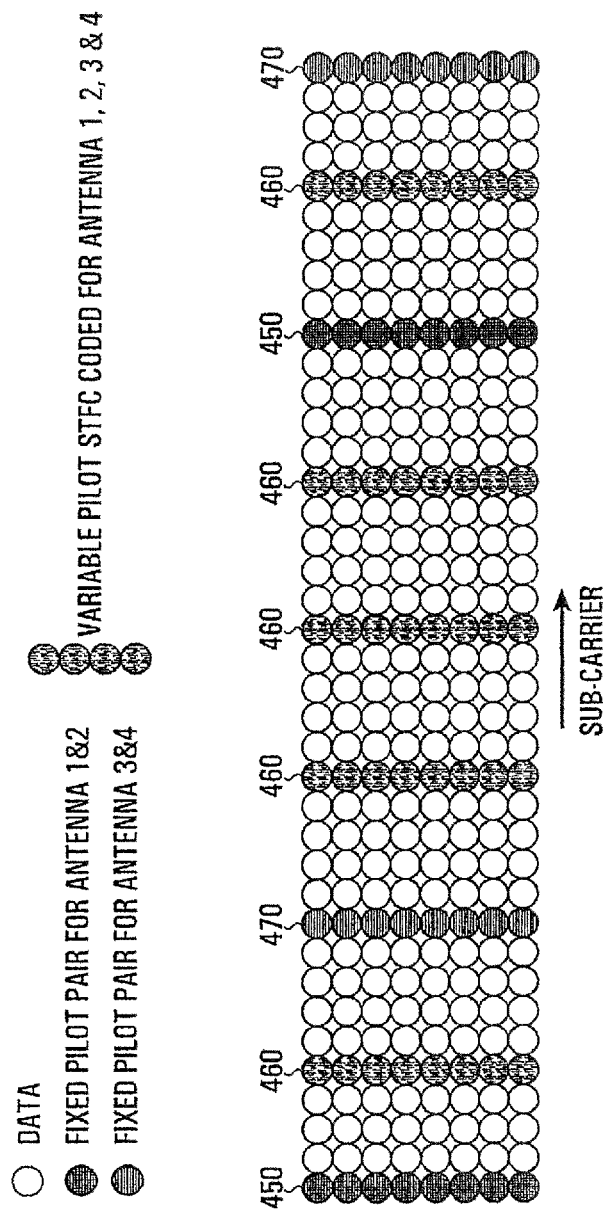

Referring now to FIG. 14B, shown is another pilot design similar to that of FIG. 14A in that pilot symbols for sets of four antennas are arranged vertically as indicated at 460. However, the sub-carrier locations used for pilot symbols are not uniformly spaced. In other sub-carrier locations 450, there is a fixed pilot for antennas 1 and 2, and at sub-carriers 470 there is a fixed pilot for antennas 3 and 4. Thus, some of the pilot symbol sub-carriers are used to transmit fixed pilot symbols while others are used to transmit variable pilot symbols for all four antennas with one sub-carrier and OFDM symbol per antenna. In the particular example shown, the spacing between the pilot sub-carriers is either three or four data sub-carriers. Of course other spacings and arrangements of the fixed and variable pilot symbols sub-carriers can be employed.

Figure 15:
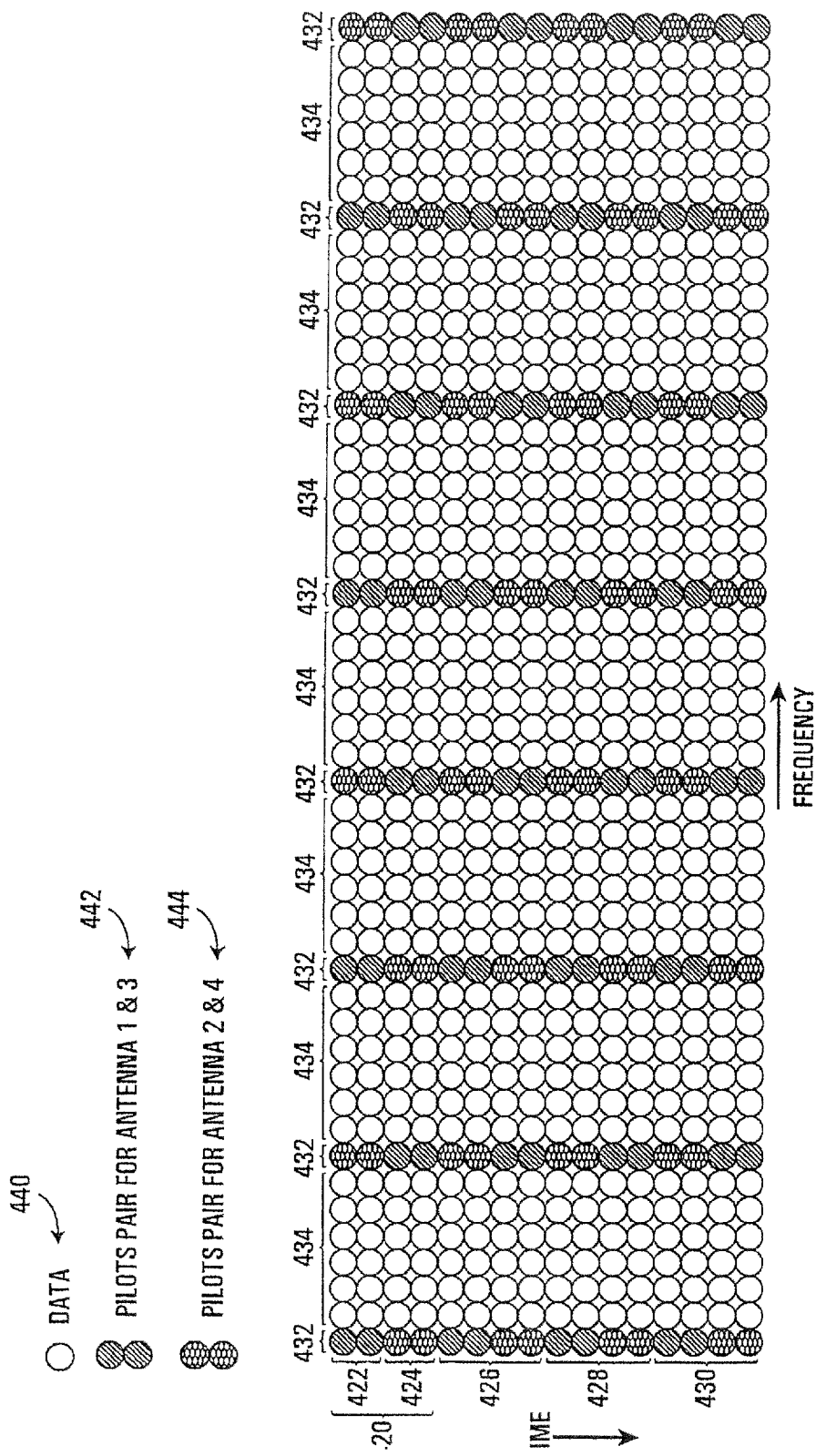

Referring now to FIG. 15, this is a specific example of the pilot design of FIG. 14A. In this example, there is again a repeating pattern of four OFDM symbols with four such sets of OFDM symbols indicated at 420,426,428,430. The first set of four OFDM symbols 420 consists of a first and second pair 422,424. Data is indicated at 440, pilot symbols for antennas 1 and 3 at 442 and pilot symbols for antennas 2 and 4 at 444. In terms of sub-carrier assignment, some of the sub-carriers 432 are used for pilot symbols and these are each separated by sets of six data sub-carriers 434. In this particular example, the pilot symbols are inserted for antennas 1 and 3 during every second pilot sub-carrier 432 during the first pair of OFDM symbols 422. Similarly, the pilot symbols for antennas 1 and 3 are inserted during every second pilot sub-carrier 432 during the second pair of OFDM symbols 424, but in pilot sub-carrier locations offset from those used in the first pair of OFDM symbols 422. The opposite pattern is used for inserting the pilot symbols for antennas 2 and 4.

Figure 16A:
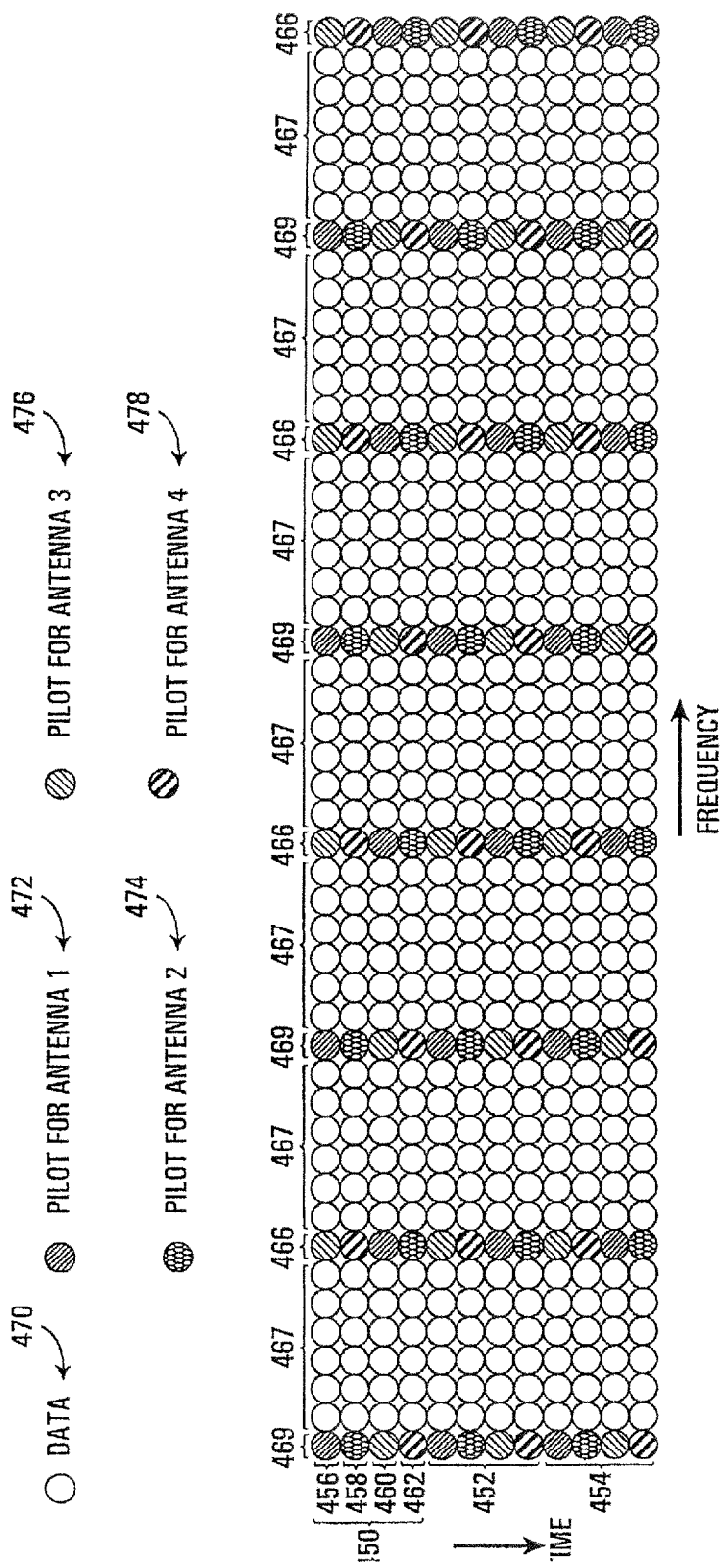

Referring now to FIG. 16A, yet another specific example of the pilot design of FIG. 14A is shown. In this example, sets of four OFDM symbols are indicated at 450,452,454. During the first OFDM symbol 450, there are four OFDM symbols 456,458,460,462. Data is indicated at 470, pilot symbols for antenna 1 at 472, pilot symbols for antenna 2 at 474, pilot symbols for antenna 3 at 476 and pilot symbols for antenna 4 at 478. In this case, a fixed layout for each pilot of each antenna is shown. The layout is similar to that of FIG. 15, but with the layout of each pilot pair being specified exactly. In this case, each pilot pair for a given pair of antennas is the same each time it is inserted. For example, in sub-carrier 469, there is a repeating pattern that consists of a pilot for antenna 1, a pilot for antenna 2, a pilot for antenna 3 and a pilot for antenna 4. The same pattern exists in sub-carrier location 466 but offset from the pattern in 469 by two OFDM symbol locations in time. Pilot sub-carriers 466,469 are separated by data sub-carriers 467.

Figure 16B:
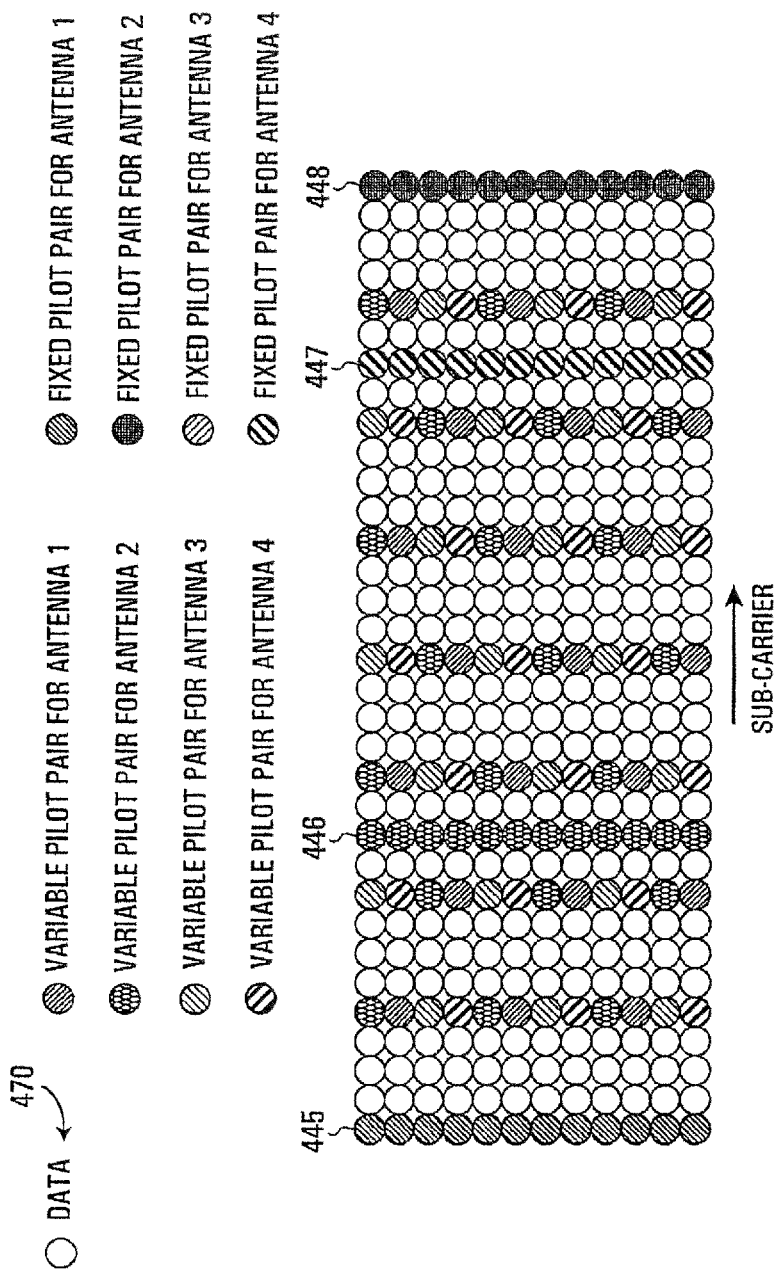

Referring now to FIG. 16B, shown is another example with vertically arranged pilots. The arrangement of the pilot symbols for a given OFDM sub-carrier is the same as that of FIG. 16A. However, in this example there is also a fixed pilot sub-carrier 445 for the first antenna; a fixed sub-carrier for 446 for the second antenna; a fixed sub-carrier 447 for the third antenna; and a fixed sub-carrier 448 for the fourth antenna. More generally, in some embodiments, there is a fixed sub-carrier for each of at least one of the four antennas. Sub-carriers during which only data is transmitted are shown inserted between the fixed pilot sub-carriers and the variable pilot sub-carrier in some cases by three sub-carriers and in some cases by one sub-carrier. The particular arrangement of fixed pilot symbols and variable pilot symbols shown in FIG. 16B is of course to be considered a particular example. Other locations for the fixed pilot symbols and the variable pilot symbols can alternatively be employed. Furthermore, while a particular layout for the four pilot symbols of a given pilot block has been shown, the vertical arrangement of FIG. 16B in which there are fixed pilot symbols and variable pilot symbols can be implemented with alternative arrangements of the pilot symbols for the given antennas.

Examples have been given where the four antennas are separated into two groups, for example Antennas 1&2 as group 1 and Antennas 2&4 as group 2. Any antenna permutation can be selected. They can be fixed for all pairs of symbols, or varying across or even within pairs of symbols.

Examples have been provided in which two sets of the scattered pilot symbols are introduced for each group, and there is no overlap between two pilot sets in time and frequency.

In some embodiments, the pilot positions are kept identical from even to odd OFDM symbols. Space-time-frequency-coding (STFC) may be applied on each pilot pair.

In some examples, the scattered pilot pairs may be shifted every two OFDM symbols (one STBC block) repeating every 6 OFDM symbols (three STBC blocks) for example. More generally, any even number of OFDM symbols can be used in the repeating pattern.

In some examples, TPS symbols are included and reused to reduce the pilot overhead. Preferably STBC applied on TPS symbols. TPS symbols can be decoded coherently with the help of the adjacent pilot symbols. Re-encoded TPS symbols can serve as pilot symbols in the detection of the data symbols.

Simple and fast channel estimation may be done based on the above pilot symbols. This involves extracting the received frequency domain data located at the pilot and/or TPS sub-carriers corresponding to each pilot set respectively. The next step is calculating the channel responses for two transmit antennas in each antenna group based on the received pilot data and the known sequences transmitted by pilot sub-carriers and the re-encoded TPS.

Preferably, all channel responses within one slot are buffered, and the channel responses of sub-carriers located at the same position as the pilot symbols are obtained by linear interpolation in time direction.

The channel responses of the data sub-carriers at the boundaries (including those at the first and the last sub-carriers in each OFDM symbol and on the first and last OFDM symbols in each slot) can be set to equal the channel responses of the adjacent pilot symbols.

A 1-D interpolation can then be applied, for example Cubic LaGrange interpolator, to reconstruct the entire channel. Other interpolation methods may alternatively be employed.

If multiple TDD slots are assigned to the downlink to the same receiver, channel estimation performance may be improved by applying the pilot symbols/re-encoded TPSs in the last two blocks in the previous TDD slot and/or the first two blocks in the next TDD slot to assist the channel response interpolation for the current slot.

Advantageously, such an efficient scattered pilot pattern reduces the pilot overhead, especially for transmit systems with four transmit antennas. Slot by slot channel response interpolation supports flexible TDD UL (uplink)and DL (downlink) partition. Slot by slot channel response estimation reduces the buffering requirement and the processing delay.

The fast signalling channel allows the extraction of TPS every slot if this is employed. Fast signalling channel reuse further reduces the pilot overhead.

In some embodiments, some of the transmit antennas can be turned off. For example two scattered pilot groups can be assigned to two transmit antennas to improve the channel estimation performance for a fast frequency selective fading channel. In further embodiments, the pilot patterns that have been described are applied to a system that has fewer than four antennas, for example two or three antennas.

As noted at the outset, the four transmit antennas can come from the same transmitter, for example a single BTS, or from different transmitters, for example different BTSs. They can also come from the antennas of single or multiple mobile stations.

For any of the embodiments described, depending upon the location of the pilots, the pilots can be either space-time coded, space-frequency coded, space-time-frequency coded or uncoded for the scattered pilots, fixed pilots and the preamble/midamble introduced below. In space-time coding, there is coding across symbols transmitted by different antennas at different times; in space-frequency coding there is coding across symbols transmitted by different antennas on different frequencies; for space-time-frequency coding, there is coding across symbols transmitted by different antennas at different times on different frequencies.

Figure 17A:
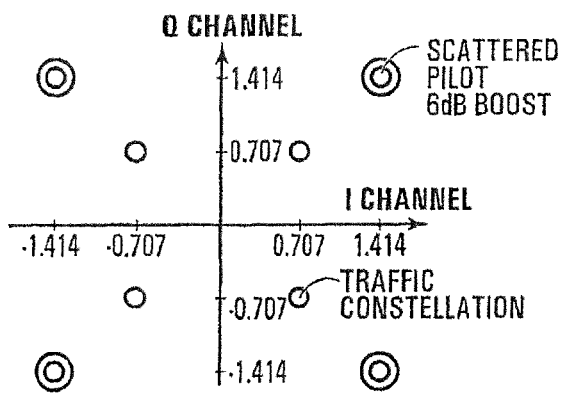
FIGS. 17A, 17B, and 17C are examples of how power boosts may be applied to pilot symbols.
Figure 17B:
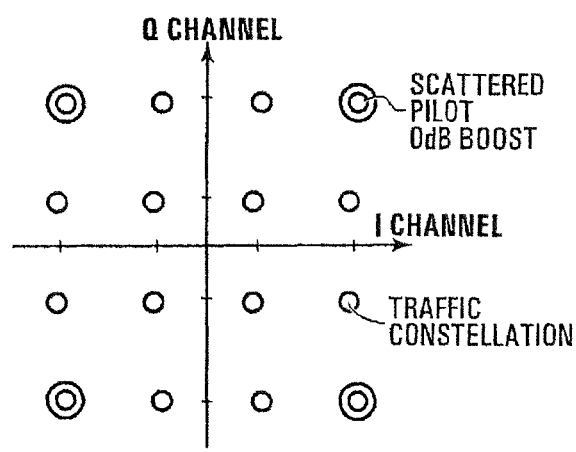
Figure 17C:
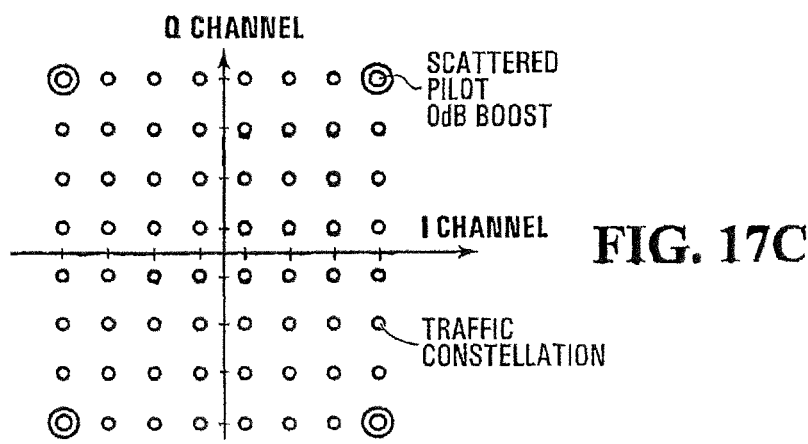

According to an aspect of the invention, the scattered pilot power is boosted based on the modulation transmission over the OFDM symbol. A power assignment for pilot and modulation constellation is listed in the table below and shown in FIGS. 17A, 17B and 17C. A fixed power boost, for example, 2.5 dB over average power can also be applied.

| Constellations | Physical Channel | Modulation Relation w.r.t. Pilot Symbol |
| --- | --- | --- |
| QPSK | Scattered Pilot | Same power as scattered pilot symbol |
| QPSK | Preamble | Same power as scattered pilot symbol |
| QPSK | Traffic | 6 dB less power than scattered pilot symbol |
| 16QAM | Traffic | Same maximum amplitude as scattered pilot symbol |
| 64QAM | Traffic | Same maximum amplitude as scattered pilot symbol |

Figure 18:
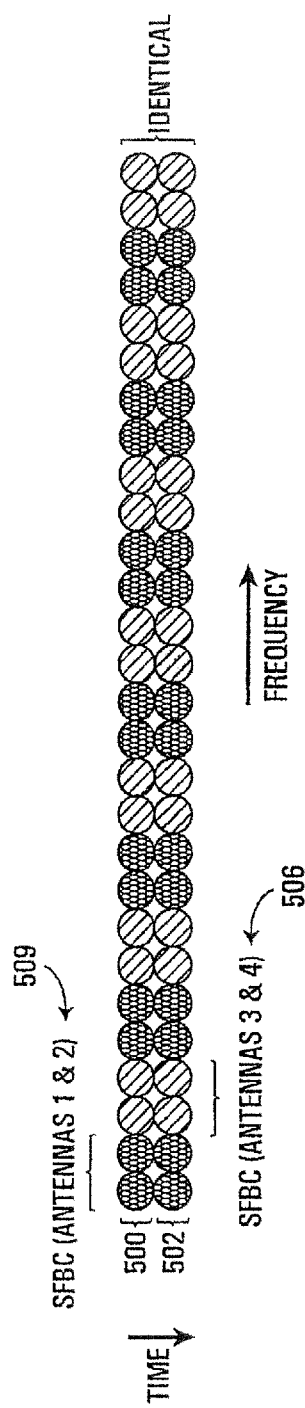
FIGS. 18 and 19 are time-frequency diagrams of pilot patterns that are suitable for use as a preamble or midamble.

Referring now to FIG. 18, shown is a time-frequency layout of pilot insertion for use as either a preamble or midamble. In a preamble, this design would be inserted preceding a set of OFDM symbols. In a midamble such a pattern would be inserted somewhere within the set of OFDM symbols forming. It can be transmitted by antennas in each BTS or transmitted by multiple antennas from multiple mobile stations. In the example of FIG. 17, the preamble consists of a pair of consecutive OFDM symbols 500,502. However, alternatively one such as one OFDM symbol only can be employed, or more than two can be employed. The pattern consists of an alternating pattern of two pilot symbols 509 for antennas 1 and 2 and two pilot symbols 506 for antennas 3 and 4. In the event that two consecutive OFDM symbols are transmitted as shown in the illustrated example, preferably the second OFDM symbol 502 is used to transmit an identical pilot pattern to that of the first OFDM symbol. Preferably, the pairs of pilot symbols, e.g. 506,509 are space-frequency coded.

Figure 19:
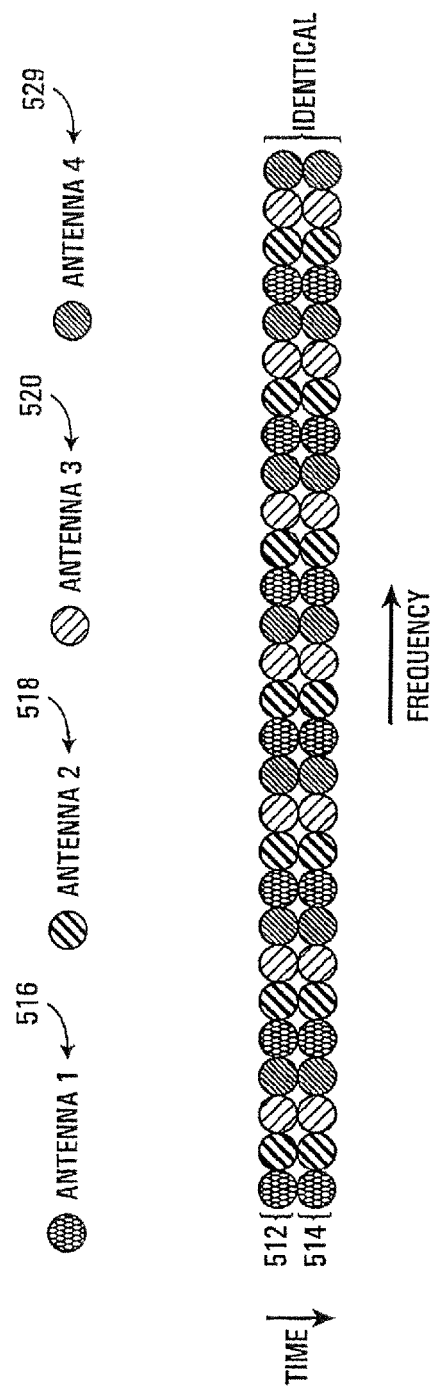

In another example, shown in FIG. 19, a more detailed layout of the sub-carrier locations is shown in which the repeating pattern is a pilot 516 for antenna 1, a pilot 518 for antenna 2, a pilot 520 for antenna 3, and a pilot 529 for antenna 4. In the illustrated example, this pattern is repeated in first and second OFDM symbols 512,514 that are identical. Other numbers of OFDM symbols can be used for a midamble and/or preamble.

Figure 20:
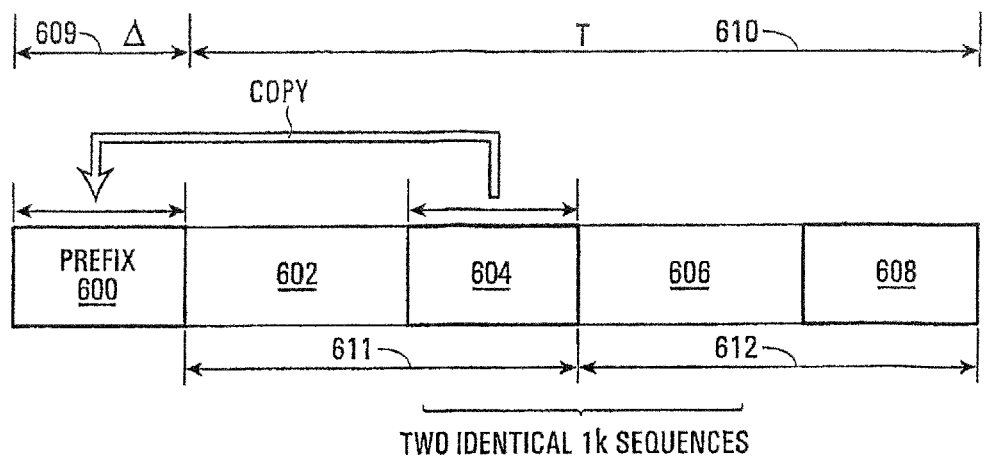
FIG. 20 is a detailed example of how two OFDM symbols for use in a preamble or midamble can be transmitted during the nominal single OFDM symbol duration.

Referring now to FIG. 20, shown is a detailed example of a preferred method of transmitting a pair of symbols, for example the two symbols of FIG. 19 or 18, as a preamble, but more generally any two consecutive identical symbols. The assumption is that this is transmitted in the context of OFDM symbols that have a duration T 610 each preceded by a prefix having a duration Δ 609. In the illustrated example, there is still a prefix 600 having a duration Δ 609. This is followed by not one OFDM symbol having a duration T, but rather two OFDM symbols 611,612 each having a duration T/2 thus, the total duration of the transmission of FIG. 20 is the same as the remainder of the symbols in the transmission, namely T+Δ. The two OFDM symbols 611,612 are identical so that synchronization can be performed at a receiver. The contents of the first OFDM symbol 611 are repeated in the second OFDM symbol 612. The first OFDM symbol 611 is shown to have portions 602,604. Similarly, the second OFDM symbol 612 is shown to have portions 606,608 that are identical to portions 602,604. The prefix 600 is set to equal the content in portion 604 of OFDM symbol 611. The nominal effect of this is that the prefix, portion 604 and portion 608 are identical, and portion 602 and 606 are identical. This means that the prefix 600 functions as a cyclic prefix for the first OFDM symbol 611, and the second portion 604 of the first OFDM symbol 611 functions as a cyclic prefix for the second OFDM symbol 612. Thus, both of the OFDM symbols 611,612 have the requisite cyclic prefix. This design allows two OFDM symbols with the requisite cyclic prefixes to be sent during the nominal single OFDM symbol and prefix duration. This allows synchronization to be performed using a single OFDM symbol duration rather than two symbol OFDM symbol durations. In a preferred example, the regular OFDM symbol is a 2K sequence, whereas in the two identical OFDM symbols of FIG. 20, each is a 1K sequence.

For the preamble and/or midamble devised with reference to FIGS. 17 and 18, in one example modulation scheme, the four antennas are separated into two groups. SFBC (space-frequency block coding) is applied to each group, and the two symbols are identical.

The following is a specific example of a preamble/midamble specific PN sequence mapping can be employed for this modulation scheme:

Transmit sequence from antenna 1:
PN(1), −PN(2)*, PN(5), −PN(6)*, . . . , PN(N−3), −PN(N−2)*
PN(2), PN(1)*, PN(6), PN(5)*, . . . , PN(N−2), PN(N−3)*
Transmit sequence from antenna 3:
PN(3), −PN(4)*, PN(7), −PN(8)*, . . . , PN(N−1), −PN(N)*
Transmit sequence from antenna 4:
PN(4), PN(3)*, PN(8), PN(7)*, . . . , PN(N), PN(N−1)*

The PN sequence is cell specific code (real or complex) and N is the number of sub-carriers in preamble/midamble symbol.

In another example modulation scheme each antenna modulates every four sub-carriers.

Channel information obtained from preamble/midamble can be used for coherent detection of the next OFDM symbol and can also be used for uplink channel sounding when transmitted by mobile stations.

An example of a preamble/midamble specific PN sequence mapping for this modulation scheme as follows:

Transmit sequence from antenna 1:
PN(1), PN(5), . . . , PN(N−3)
Transmit sequence from antenna 2:
PN(2), PN(6), . . . , PN(N−2)
Transmit sequence from antenna 3:
PN(3), PN(7), . . . , PN(N−1)
PN(4), PN(8), . . . , PN(N)

Numerous modifications and variations of the present invention are possible in light of the above teachings. It is therefore to be understood that within the scope of the appended claims, the invention may be practiced otherwise than as specifically described herein.

We claim:

1. A method of transmitting including using four transmit antennas, comprising:
for each antenna of the four transmit antennas;
generating a respective sequence of OFDM symbols, each OFDM symbol having a plurality of sub-carriers carrying data symbols or pilot symbols, wherein:
the pilot symbols are arranged in groups, each group of pilot symbols including a pilot symbol pair for each of the four antennas, and
a first group of pilot symbols are inserted into the OFDM symbols such that the pilot symbols for a first two of the antennas are arranged in a first pilot symbol pair, wherein the elements of the first pilot symbol pair are positioned adjacent in time on the same sub-carrier, the pilot symbols for a second two of the antennas are arranged in a second pilot symbol pair, wherein the elements of the second pilot symbol pair are positioned adjacent in time on the same sub-carrier, and the first pilot symbol pair for the first two of the antennas are non-adjacent in frequency to the second pilot symbol pair of the second two of the antennas; and
transmitting the sequence of OFDM symbols.

2. The method of claim 1, wherein, for the first group of pilot symbols, the pilot symbols for the first two of the antennas are separated in time by at least one data symbol from the pilot symbols for the second two of the antennas.

3. The method of claim 1, wherein, for the first group of pilot symbols, the pilot symbols for the first two of the antennas occupy the same OFDM symbols in time as the pilot symbols for the second two of the antennas.

4. The method of claim 3, wherein the pilot symbols of the first group for the first two of the antennas are non-adjacent in time a second group of pilot symbols for the first two of the antennas.

5. The method of claim 4, wherein the pilot symbols of the first group for the first two of the antennas are separated in frequency by predetermined plurality of subcarriers from the pilot symbols for a third group of pilot symbols for the first two of the antennas.

6. The method of claim 1, wherein, for the first group of pilot symbols, the pilot symbols for the first two of the antennas are separated in time by a first predetermined number of data symbols from the pilot symbols of the second two of the antennas, and, the pilot symbols of the first group of the second two of the antennas are separated in frequency by a second predetermined number of subcarriers from a next group of pilot symbols for the first two of the antennas.

7. The method of claim 1, wherein the pilot symbols of the first group for the first two of the antennas are adjacent in time from a next group of pilot symbols for the second two of the antennas.

8. A mobile station, comprising:
four transmit antennas; and
a transmitter that, for each of the four transmit antennas;
generates a respective sequence of OFDM symbols, each OFDM symbol having a plurality of sub-carriers carrying data symbols or pilot symbols, wherein:
the pilot symbols are arranged in groups, each group of pilot symbols including a pilot symbol pair for each of the four antennas, and
a first group of pilot symbols are inserted into the OFDM symbols such that the pilot symbols for a first two of the antennas are arranged in a first pilot symbol pair, wherein the elements of the first pilot symbol pair are positioned adjacent in time on the same sub-carrier, the pilot symbols for a second two of the antennas are arranged in a second pilot symbol pair, wherein the elements of the second pilot symbol pair are positioned adjacent in time on the same sub-carrier, and the first pilot symbol pair for the first two of the antennas are non-adjacent in frequency to the second pilot symbol pair of the second two of the antennas; and
transmits the sequence of OFDM symbols.

9. The mobile station of claim 8, wherein, for the first group of pilot symbols, the pilot symbols for the first two of the antennas are separated in time by at least one data symbol from the pilot symbols for the second two of the antennas.

10. The mobile station of claim 8, wherein, for the first group of pilot symbols, the pilot symbols for the first two of the antennas occupy the same OFDM symbols in time as the pilot symbols for the second two of the antennas.

11. The mobile station of claim 10, wherein the pilot symbols of the first group for the first two of the antennas are non-adjacent in time a second group of pilot symbols for the first two of the antennas.

12. The mobile station of claim 11, wherein the pilot symbols of the first group for the first two of the antennas are separated in frequency by predetermined plurality of sub-carriers from the pilot symbols for a third group of pilot symbols for the first two of the antennas.

13. The mobile station of claim 8, wherein, for the first group of pilot symbols, the pilot symbols for the first two of the antennas are separated in time by a first predetermined number of data symbols from the pilot symbols of the second two of the antennas, and, the pilot symbols of the first group of the second two of the antennas are separated in frequency by a second predetermined number of subcarriers from a next group of pilot symbols for the first two of the antennas.

14. The mobile station of claim 8, wherein the pilot symbols of the first group for the first two of the antennas are adjacent in time from a next group of pilot symbols for the second two of the antennas.

15. An integrated circuit, comprising;
for each antenna of four transmit antennas;
circuitry to generate a respective sequence of OFDM symbols, each OFDM symbol having a plurality of sub-carriers carrying data symbols or pilot symbols, wherein:
the pilot symbols are arranged in groups, each group of pilot symbols including a pilot symbol pair for each of the four antennas, and
a first group of pilot symbols are inserted into the OFDM symbols such that the pilot symbols for a first two of the antennas are arranged in a first pilot symbol pair, wherein the elements of the first pilot symbol pair are positioned adjacent in time on the same sub-carrier, the pilot symbols for a second two of the antennas are arranged in a second pilot symbol pair, wherein the elements of the second pilot symbol pair are positioned adjacent in time on the same sub-carrier, and the first pilot symbol pair for the first two of the antennas are non-adjacent in frequency to the second pilot symbol pair of the second two of the antennas; and
circuitry to transmit the sequence of OFDM symbols.

16. The integrated circuit of claim 15, wherein, for the first group of pilot symbols, the pilot symbols for the first two of the antennas are separated in time by at least one data symbol from the pilot symbols for the second two of the antennas.

17. The integrated circuit of claim 15, wherein, for the first group of pilot symbols, the pilot symbols for the first two of the antennas occupy the same OFDM symbols in time as the pilot symbols for the second two of the antennas.

18. The integrated circuit of claim 17, wherein the pilot symbols of the first group for the first two of the antennas are non-adjacent in time a second group of pilot symbols for the first two of the antennas.

19. The integrated circuit of claim 18, wherein the pilot symbols of the first group for the first two of the antennas are separated in frequency by predetermined plurality of sub-carriers from the pilot symbols for a third group of pilot symbols for the first two of the antennas.

20. The integrated circuit of claim 18, wherein, for the first group of pilot symbols, the pilot symbols for the first two of the antennas are separated in time by a first predetermined number of data symbols from the pilot symbols of the second two of the antennas, and, the pilot symbols of the first group of the second two of the antennas are separated in frequency by a second predetermined number of subcarriers from a next group of pilot symbols for the first two of the antennas.

* * * * *